United States Patent
Stephens, Jr. et al.

(10) Patent No.: US 7,512,968 B2
(45) Date of Patent: *Mar. 31, 2009

(54) SYSTEM AND METHOD FOR SECURE MANAGEMENT OF REMOTE SYSTEMS

(75) Inventors: Daniel Guy Stephens, Jr., St. Petersburg, FL (US); Edwin Powali, Tampa, FL (US); Stephen Lombard, St. Petersburg, FL (US)

(73) Assignee: Netwolves Corporation, Tampa, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/805,244

(22) Filed: May 22, 2007

(65) Prior Publication Data

US 2007/0294757 A1 Dec. 20, 2007

Related U.S. Application Data

(63) Continuation of application No. 09/702,483, filed on Oct. 31, 2000, now Pat. No. 7,222,228.

(60) Provisional application No. 60/211,399, filed on Jun. 14, 2000, now abandoned.

(51) Int. Cl.
 *G06F 15/16* (2006.01)
 *H04L 9/00* (2006.01)

(52) U.S. Cl. .................... 726/3; 726/12; 713/150

(58) Field of Classification Search ......... 713/150–153, 713/168; 726/2–3, 5–6, 17–18, 12; 709/220–221
See application file for complete search history.

(56) References Cited

U.S. PATENT DOCUMENTS

| | | | |
|---|---|---|---|
| 6,110,041 A | 8/2000 | Walker et al. | |
| 6,230,194 B1 | 5/2001 | Frailong et al. | |
| 6,266,774 B1 | 7/2001 | Sampath et al. | |
| 6,272,532 B1 | 8/2001 | Feinleib | |
| 6,272,549 B1 | 8/2001 | Daniel | |
| 6,532,543 B1 | 3/2003 | Smith et al. | |
| 7,051,365 B1 * | 5/2006 | Bellovin | 726/11 |
| 7,222,228 B1 * | 5/2007 | Stephens et al. | 713/1 |

OTHER PUBLICATIONS

Stallings, Network and Internetwork Security Principles and Practice, Prentice Hall, New Jersey 1995, p. 366.

* cited by examiner

*Primary Examiner*—Hosuk Song
(74) *Attorney, Agent, or Firm*—Malloy & Malloy, P.A.

(57) ABSTRACT

A secure system and method for managing and monitoring remote devices preferably includes periodic pulling of configuration information from an accessible platform rather than pushing information from a central site. In one implementation, an electronic mail system is used as a staging platform in combination with a defined polling arrangement to transfer encrypted configuration information in a robust and secure method for updating remote device configurations.

20 Claims, 18 Drawing Sheets

FIG. 3A

CONFIGURATION DATA

ADMINISTRATION MANAGEMENT
- ENCRYPTION / DECRYPTION KEY
- CLIENT DATA
- CLIENT STATUS
- . . .

GATEWAY SERVER
- HOST INFORMATION
- DEVICE SETUP
- MANAGE DOMAIN NAME SYSTEM (DNS)
- MANAGE ROUTES
- MANAGE DYNAMIC HOST CONFIGURATION PROTOCOL (DHCP)
- DEFINE FIREWALL OBJECTS
- DEFINE FIREWALL RULES
- CHECK FIREWALL STATUS
- SETUP EMAIL
- SETUP USERS
- SETUP GROUPS
- CONFIGURE FILE SHARING
- CHECK DEVICE OPERATING STATISTICS
- . . .

301

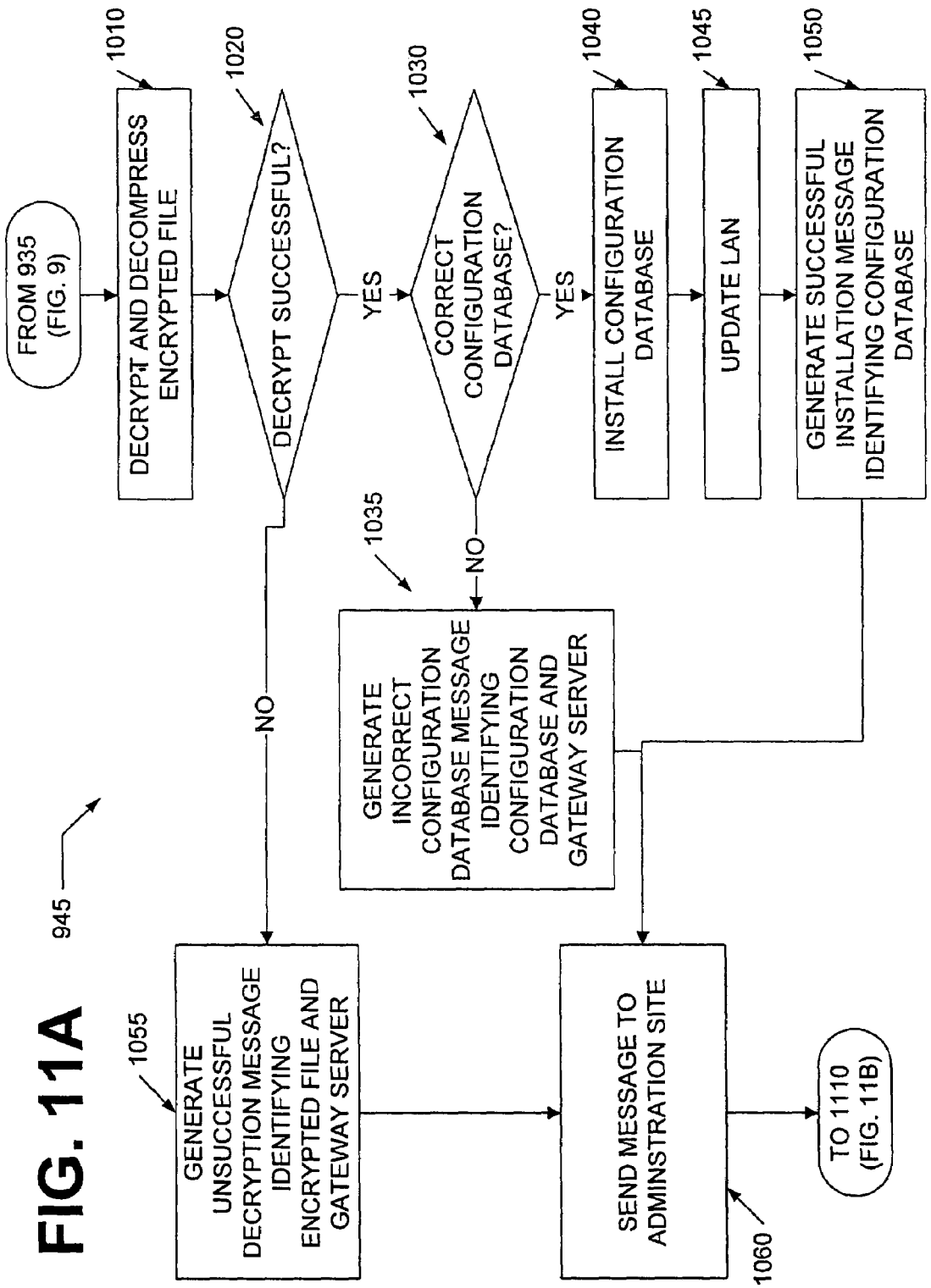

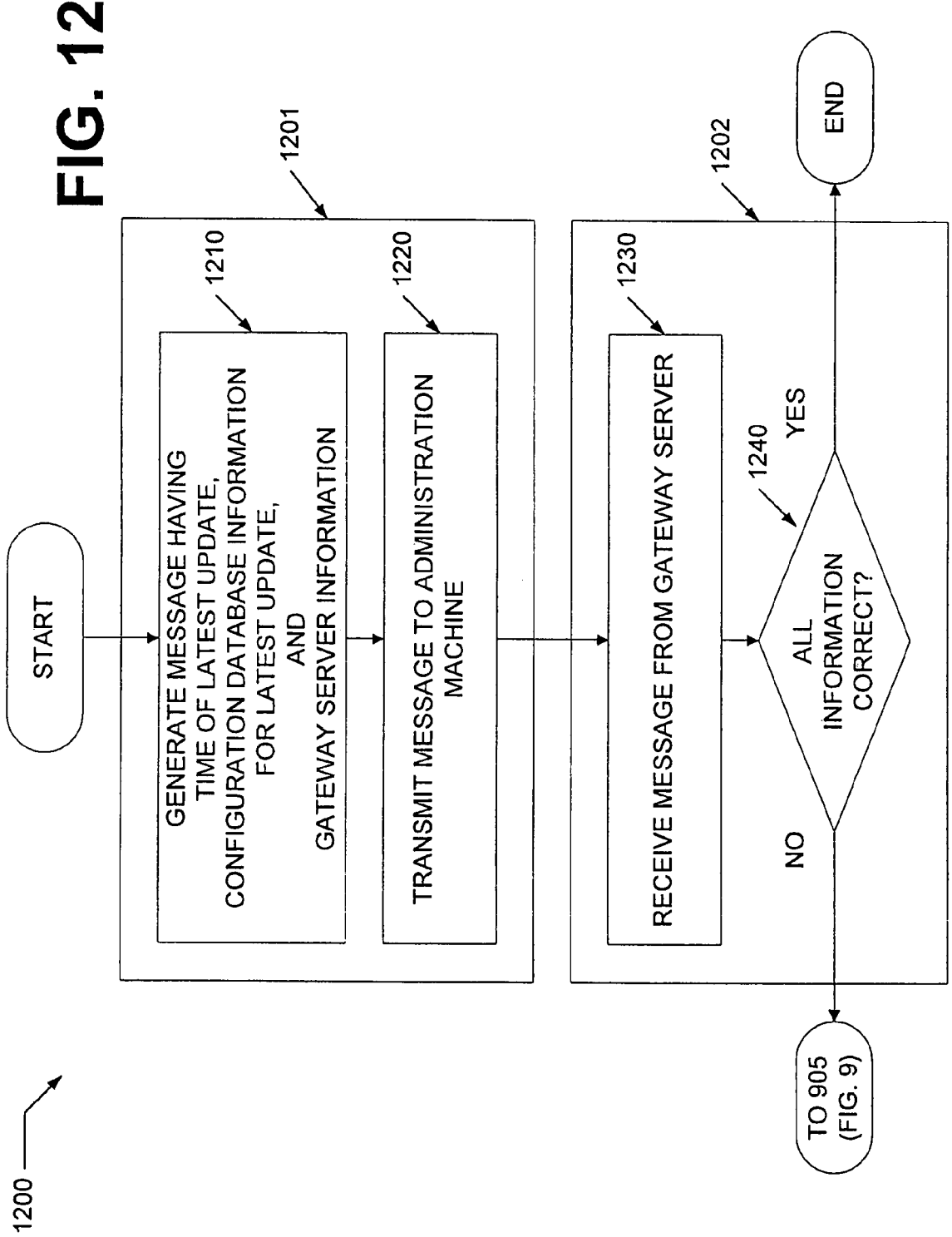

SYSTEM AND METHOD FOR SECURE MANAGEMENT OF REMOTE SYSTEMS

CLAIM OF PRIORITY

The present application is a continuation of and claims priority to previously filed and currently U.S. patent application having Ser. No. 09/702,483, filed on Oct. 31, 2000, which matured into U.S. Pat. No. 7,222,228 on May 22, 2007, and which claims priority to provisional patent application having Ser. No. 60/211,399, filed on Jun. 14, 2000, now abandoned, to which the present application also claims priority, both of which are incorporated herein by reference.

FIELD OF THE INVENTION

The present disclosure relates generally to the management of computer systems. More particularly, the disclosure relates to a secure method and system for remote management and monitoring of network devices.

BACKGROUND

Typically, the hardware and software setup of a computer system is determined by a collection of related and unrelated files and directories having various parameters related to the assortment of components that make up the computer system. During the installation of a new device or program, the computer needs to be manually or automatically reconfigured to accommodate the new device or program. For example, when installing a new hard drive onto the system, pertinent information about capacity, brand and how it is connected must be available to the operating system to make internal decisions for proper access. Similarly, when new software is installed onto the system, pertinent information must be available to the new software to make internal decisions to properly run the newly installed program and not impact the current environment. The configuration information for hardware and software is typically stored in one or more configuration files. Typically, during the initialization of the operating system program and at the start of additional programs; the programs will access their assigned configuration files to retrieve values to be used by the programs for parameters that may vary from computer to computer depending on the environment and user preferences. This allows for the proper functioning of devices and programs to work together on a computer system. This dynamic configuration capability enables a wide combination of devices and software to work together and be well behaved.

Similar to individual computer systems, one or more configuration files are needed to control computer networks. These are after all typically just a specialized combination of an operating system, devices and programs. A local area network (LAN) typically consists of several individual computers connected to each other over a communication connection. Similar to how an individual computer system needs information on various devices and programs in order to function properly, LAN servers need information on the various individual computers on the network in order for those individual computers to function properly and be well behaved while connected. As new computers are added to the network, reconfiguration of the network server may be necessary. For example, if a new workstation were added to a LAN, the network server would need the address of the workstation (i.e., information on how to access that workstation) in order to route the new workstation messages and requests correctly to communicate with other devices on the network. Similarly, if a new printer were added to the network, the network server would need information about the new printer in order to have proper access to the printer by other devices on the network (i.e., access by the workstations on the network).

A gateway server often includes hardware and software for connecting LANs to the Internet. Similar to network servers, gateway servers need to be correctly configured in order to have proper functioning of the LAN vis-à-vis the Internet. The necessary information for configuring a gateway server is often contained in a configuration file for the gateway server. Since the gateway server acts as an interface between the LAN and the Internet, it is imperative that these gateway servers are properly monitored and managed. Illustrative of the importance of gateway servers, if a gateway server malfunctions, then it is possible that the entire LAN may be denied access to the Internet or permit unauthorized access to the gateway server and/or LAN. Moreover, since the gateway server is the LAN's connection to the "outside world," if a particular gateway server is compromised, then individual systems on the LAN connected to the gateway server are susceptible to tampering. Likewise, in wide area networks (WAN) having multiple gateway servers, a compromise of one gateway server may risk compromise of other gateways in the WAN.

Historically, managing gateway servers required accessing each gateway server's configuration file using a proprietary interface and manually typing in countless parameter values. Once the gateway server is operational, should reconfiguration be necessary or desired, that gateway server's configuration interface must be accessed again, and the required configuration changes applied. In order to do this securely, the administrator would have to, either, be physically present at the location of the gateway server, or have access to the unit's configuration interface via a secure channel. Moreover, if multiple gateway servers need simultaneous reconfiguring, which is often the case for multiple gateway servers managed by the same organization, the administrator would need to access each unit's configuration interface in turn to make changes to each individual unit. This makes reconfiguration of gateway servers difficult and time consuming.

Alternatively, methods of allowing pre-configuration scripts to be backed up from one unit and applied to another via means such as file transfer protocol (FTP) are among other methods of remote configuration. These remote management methods have traditionally required each unit to monitor all incoming messages and respond to incoming requests for reconfiguration from an off-site administration machine. Such a method requires that each gateway server maintain an open port for incoming requests, thus, rendering each unit vulnerable to an attack by a hacker (e.g., denial of service attacks). This problem becomes accentuated in the context of configuration files as a system's resources may become consumed in identifying and attempting to configure a device before the system realizes that it has incorrect or corrupt configuration data. In addition, the conventional simple network management protocol (SNMP) system has often been used for configuration managements. SNMP, however, suffers from being so difficult to configure and maintain that it is often improperly set up, poorly maintained, or ultimately neglected to the point that it becomes a security risk.

From the foregoing, it can be appreciated that there is a need in the art for a method and system for remotely managing networked devices in the hostile Internet environment without sacrificing security.

SUMMARY

The present disclosure relates to a method and system for securely managing remote networked devices, one non-limiting example being gateway servers. Unlike previous methods of managing remote devices where an administration system "pushes" commands or files to a remote device, the preferred embodiment of the present invention provides a method where the remote devices automatically "pull" pertinent information from a secure source, preferably other than an administration system, which provides for greater security in managing and monitoring the remote devices.

In one implementation, the system of the preferred embodiment of the present invention includes an administration system that securely forwards configuration information to a staging platform (e.g., a mail server) for subsequent retrieval by remote network devices (e.g., gateway servers, automatic teller machines, etc.) that poll the staging platform for configuration information in a defined manner and automatically reconfigure according to the configuration information and secured processes.

The features and advantages of the invention will become apparent upon reading the following detailed description, when taken in conjunction with the accompanying drawing.

BRIEF DESCRIPTION OF THE DRAWINGS

The system and method for remote configuration and monitoring of gateway sites can be better understood with reference to the following drawings. The components in the drawings are not necessarily to scale, emphasis instead being placed upon clearly illustrating the principles of the present invention.

FIG. 3A is a diagram illustrating example configuration data.

FIG. 11A is a flow chart illustrating the file-processing step of FIG. 9 in more detail.

FIG. 12 is a flow chart illustrating one portion of a method of monitoring remote gateway sites.

Like reference numerals refer to like parts throughout the several views of the drawings.

DETAILED DESCRIPTION

Previous methods of managing and monitoring remote gateway servers used a "push" method of administration. In other words, an administration machine, which was responsible for the administration of remote gateway servers, would reconfigure each gateway server by remotely accessing each unit and "pushing" configuration data to each unit (i.e., sending or writing new configuration data onto the gateway server). Those "push" methods would require each gateway server to monitor and respond to incoming requests for reconfiguration from an off-site administration machine, thus, requiring each unit to maintain an open port for incoming requests. Those open ports would render each unit vulnerable to an attack by a hacker (e.g., denial of service attacks). In contrast to that "push" method, a "pull" method, as described by this disclosure, would allow for remote management of gateway servers without the compromised security inherent in traditional "push" methods. While particular embodiments of the invention will be disclosed, it will be understood by those skilled in the art that variations and modifications thereof can be made without departing from the scope of the invention as set forth.

Figure 1A:
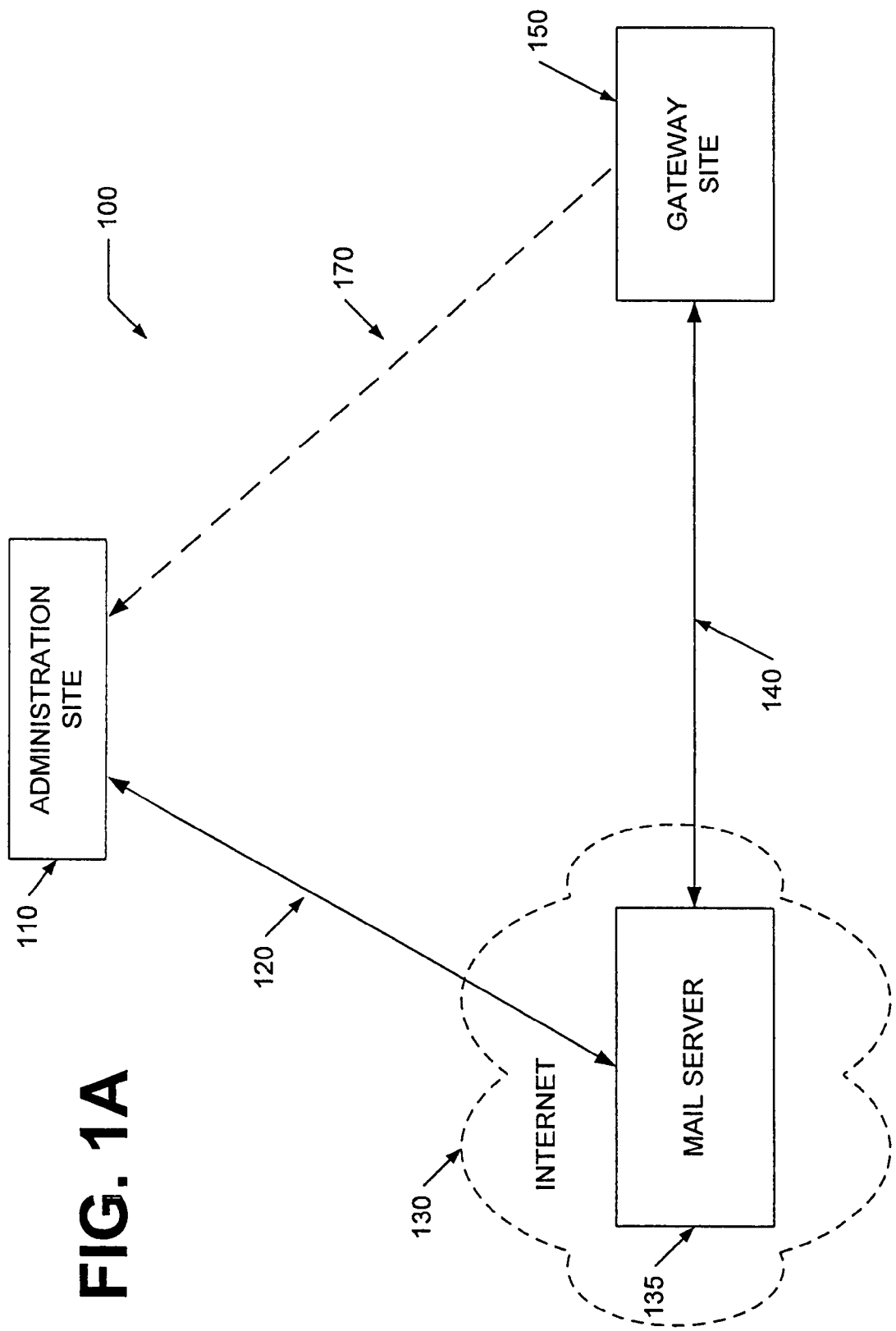
FIG. 1A is a block diagram illustrating the relationship between an administration site, a mail server, and a gateway site in an embodiment of the system.

Referring now in more detail to the drawings, in which like numerals indicate corresponding parts throughout the several views, FIG. 1A is a block diagram illustrating an overview of the system 100 having an administration site 110, a mail server 135, and a gateway site 150 in a remote configuration and remote monitoring system. The system can be seen as having three main components that are connected to one another through communications pathways. The administration site 110, which is responsible for the administration of a gateway site 150, is connected to the gateway site 150 through a communications pathway 170. In a typical "push" system of administration, the administration site 110 would have direct access to the gateway site 150, thus, allowing the administration site 110 to directly transfer (or "push") configuration information from the administration site 110 to the gateway site 150 through the communications pathway 170. As mentioned above, this requires the gateway site 150 to maintain an open port, which grants access to the administration site 110 as well as potentially opening up the gateway site 150 to potential hackers. The administration site 110 is also connected to a mail server 135 on the Internet 130 through a communications pathway 120. Furthermore, the mail server 135 is accessible to the gateway site 150 through a communications pathway 140.

Generally, in the preferred embodiment of the invention, the administration site 110 places configuration data on the mail server 135 for retrieval by the gateway site 150 through a communications pathway 140. Since the gateway site is "pulling" (rather than "pushing") the configuration data from the mail server 135 according to a defined schedule, no open port is required as in previous methods and, therefore, the system is less vulnerable to penetration from hackers or other unwanted intruders. Also, if, though not the case in all embodiments, the mail server 135 is a publicly accessible mail server, such as those available through "hotmail" or "yahoo," then the configuration data may be available to the gateway site 150 through a simple mail transfer protocol (SMTP). The advantage to using SMTP is that, not only is SMTP simple to setup and operate, the worldwide SMTP system has numerous failsafe and failover processes, thus ensuring storage and delivery of email with a reduced risk a down time. Thus, this system provides a method for reliably configuring remote devices.

The system of FIG. 1A also preferably provides a method for monitoring a gateway site. The communications pathway 170 is now used as a "checksum" or "heartbeat" pathway, which allows the gateway site 150 to periodically transmit a user datagram protocol (UDP) packet to the administration site 110 to indicate the active status of the gateway site 150. A failure to receive a scheduled UDP packed preferably causes a monitoring process in the administration site 110 to generate an alarm to notify appropriate personal that the gateway site 150 in possibly inactive. In one embodiment, an encrypted socket connection is used to push current status information up to the administration site 110. In addition, since both the gateway site 150 and the administration site 110 are connected to the mail server 135 on the Internet 110, SMTP may also be used to monitor the gateway site 150 by the administration site 110. In the preferred embodiment, email messages are also periodically transmitted from the gateway site 150, preferably through the mail server 135, to the administration site 110 to confirm that the gateway site 150 is operating with the correct configuration information. Of course, other embodiments are included within the scope of the present invention that do not include one or more of these monitoring mechanisms.

Figure 1B:
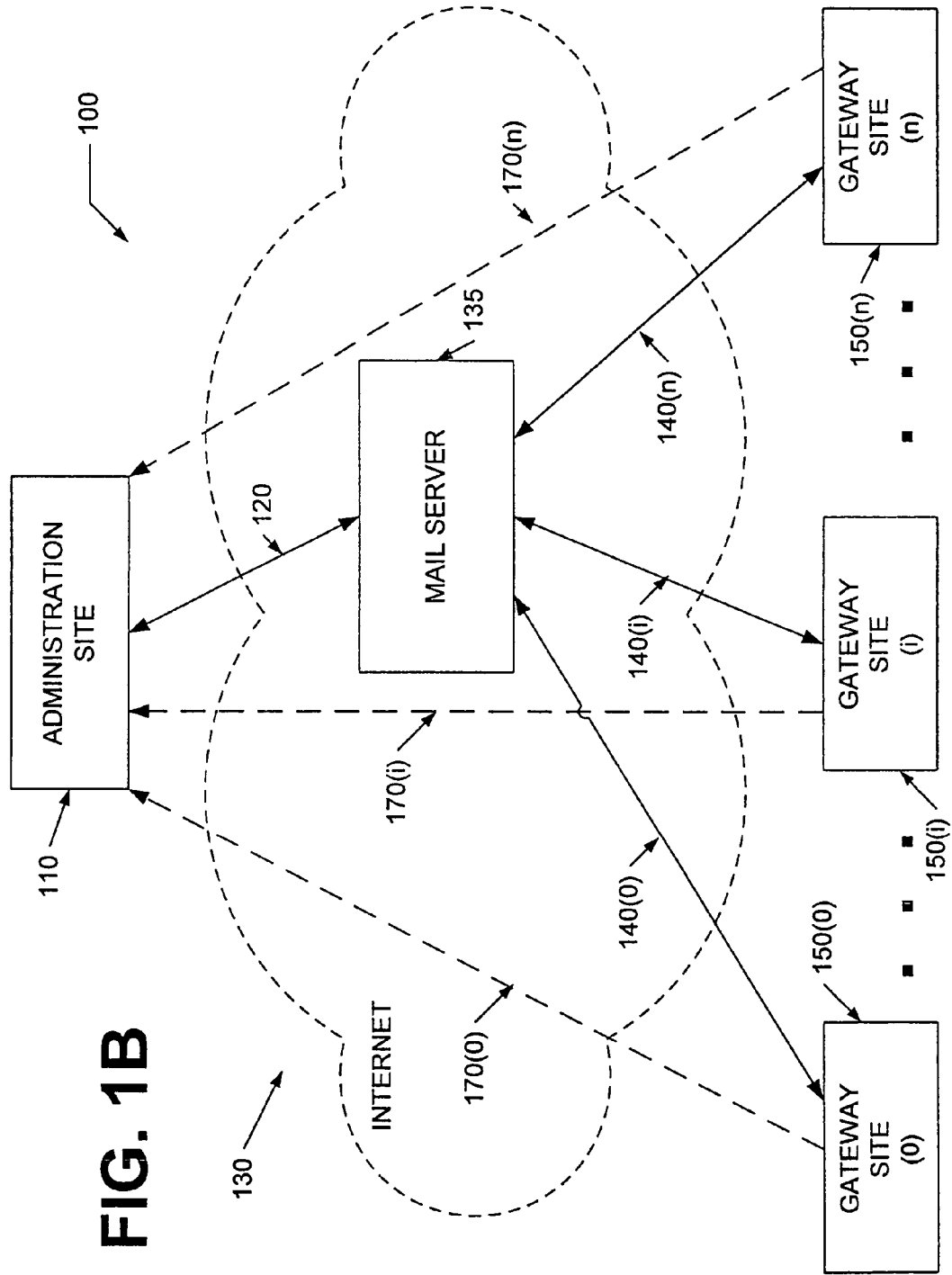
FIG. 1B is a block diagram illustrating an embodiment of the invention for a plurality of gateway sites.

FIG. 1B is a block diagram illustrating the remote configuration and monitoring system 100 for a plurality of gateway sites 150(0 . . . n). It is often the case where an administration site 110 is responsible for monitoring and managing a plurality of gateway sites 150(0 . . . n). In these circumstances, the administration site 110 often desires concurrent reconfiguration (i.e., reconfiguration at approximately the same time) of the gateway sites 150(0 . . . n). Historically, in prior systems, in order for the administration site 110 to reconfigure each gateway site 150(0 . . . n), the administration site 110 would have to directly access each individual gateway site 150(0 . . . n) and reconfigure each gateway site 150(0 . . . n) individually. As shown in FIG. 1B, the system of storing configuration data on a mail server 135 on the Internet 130 allows each gateway site 150(0 . . . n) to access the mail server 135 through a communications pathway 140(0 . . . n), thus, allowing for concurrent reconfiguration of a plurality of gateway sites 150(0 . . . n). Also, since there are no ports left open at any of the individual gateway sites 150(0 . . . n), the system is less vulnerable to intrusion by hackers. Moreover, since all gateway sites 150(0 . . . n) and the administration site 110 are on the Internet, a UDP packet may be transmitted directly from the gateway sites 150(0 . . . n) to the administration site 110 through the Internet 130.

Although the mail server 135 and the administration site 110 are depicted separately in FIGS. 1A and 1B, in another embodiment of the invention, the mail server 135 may be located at the administration site 110 as an integrated portion of the administration site 110. Regardless of whether or not the mail server 135 and the administration site 110 are integrated, the polling of the mail server 135 by the gateway site 150 allows for greater security because there is now no need for the gateway site 150 to keep a port open. In addition, other embodiments of the present invention also include separating from the administration site 110 into a separate site one or more of the monitoring functions discussed above.

Figure 2:
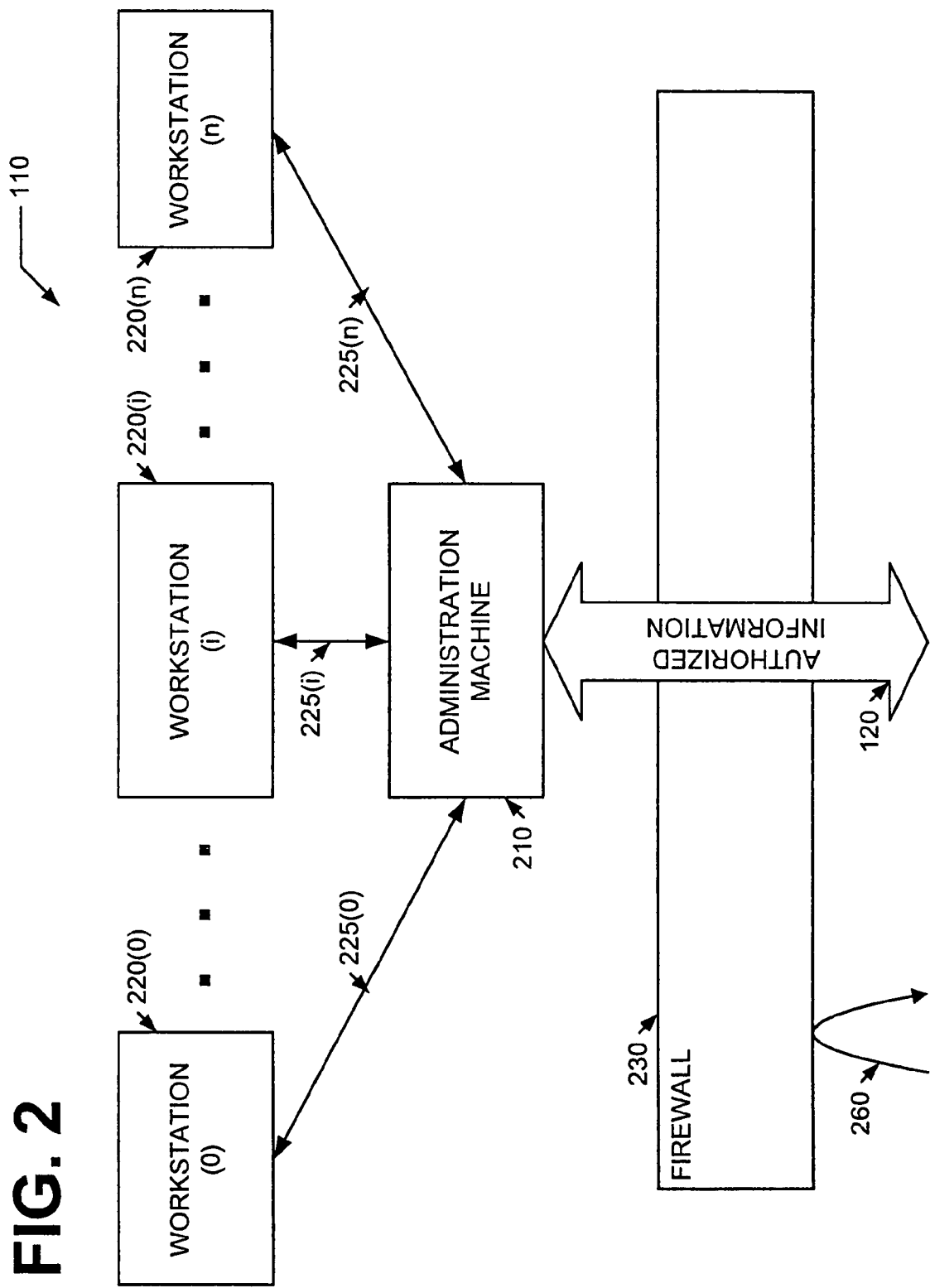
FIG. 2 is a block diagram showing an exploded view of the administration site of FIG. 1B.

FIG. 2 is a block diagram showing an exploded view of the administration site 110 of FIG. 1B. An administration site 110 may be a local area network (LAN) having an administration machine 210 connected to a plurality of workstations 220(0 . . . n) through LAN interfaces 225(0 . . . n). Typically, the LAN is located behind a firewall 230, which protects the LAN from unauthorized access by allowing only authorized information to pass the firewall 230 through a communications pathway 120, and denying unauthorized information 260 from penetrating the firewall 230. Within the LAN, each local workstation 220(0 . . . n) freely communicates with the other workstations 220(0 . . . n) on that LAN as well as with the administration machine 210. This allows for administration of the LAN from any of the workstations 220(0 . . . n) on the administration site 110 LAN. Although a plurality of workstations 220(0 . . . n) is shown in this example, it will be clear to one of ordinary skill in the art that the administration site 110 may comprise only the administration machine 210, or any combination of workstations 220(0 . . . n) and the administration machine 210. Moreover, it will be clear to one of ordinary skill in the art that, while an external firewall 230 is shown for illustrative purposes, the administration machine 210 may comprise an internal firewall or other similar security measure for preventing access to the administration site 110 by intruders. Also, a workstation 220(i) may be configured as the mail server 135 (FIG. 1B), thus, integrating the mail server 135 (FIG. 1B) into the administration site 110 as mentioned in connection with FIGS. 1A and 1B.

FIG. 3A is a diagram illustrating portions of an example configuration data 301. Gateway sites 150(0 . . . n) (FIG. 1B) often include gateway servers with hardware and software for connecting LANs and workstations to the Internet 130 (FIG. 1B). These gateway servers need to be correctly configured in order to ensure proper functioning of the LANs vis-à-vis the Internet. Information for configuring a gateway server is contained in configuration data 301 for the gateway server. The example configuration data 301 shows a file (or other data structure in other embodiments) having configuration information regarding administration and gateway functions. The importance of this configuration information will become apparent below during the discussion of the installation of portions of the configuration data 301 onto the gateway servers (FIG. 7C, later discussed). The administration machine 210 (FIG. 2) may reconfigure host information, device setup, firewall filters and definitions, email settings, and other parameters of the gateway servers. For example, the following list includes Unix services and processes, as would be understood by one reasonably skilled in the art of the present invention, that are configured in one implementation of the preferred embodiment of the present invention: sendmail and mail archive; fetchmail, Apache web cache; Squid web cache; Samba file sharing; DNS and bind; ipfilter firewall rules; ipnat ip address redirection; ipconfig set ip address and hostnames; route manage routes; web access control; add users, group, mail; VPN ip tunneling, intrusion detection sub-system. Another grouping of such information in one implementation includes: ip filter rules, hostname, intrusion detection, ethernet ipaddress netmask, unix users, mail server, route data, and device type. Still another grouping could include information describing the hostname of the gateway machine, local data and time information, information describing each network interface, information with respect to domain name system configuration, information governing the routing of network information between network interfaces, information governing the configuration of machines connected to the protected local area network, information governing firewalls and other security information, information governing web access control, information governing the configuration of a mail server, information governing users and groups, information governing file sharing, information governing virtual private networking and other information concerning the services and configuration of the gateway machine. Although an example of configuration data is included in the provisional application incorporated by reference above, it will be clear to one of ordinary skill in the art that the configuration data may be modified to, either, contain other information pertinent to the operation of the gateway server, or remove certain configuration information, without affecting the essence of the invention. In addition, for network devices other than gateway servers, configuration information can include other types and configuration information known to be used in configuring such devices. Furthermore, select types of data, as opposed to configuration information, may also be transferred through the polling techniques disclosed herein.

Figure 3B:
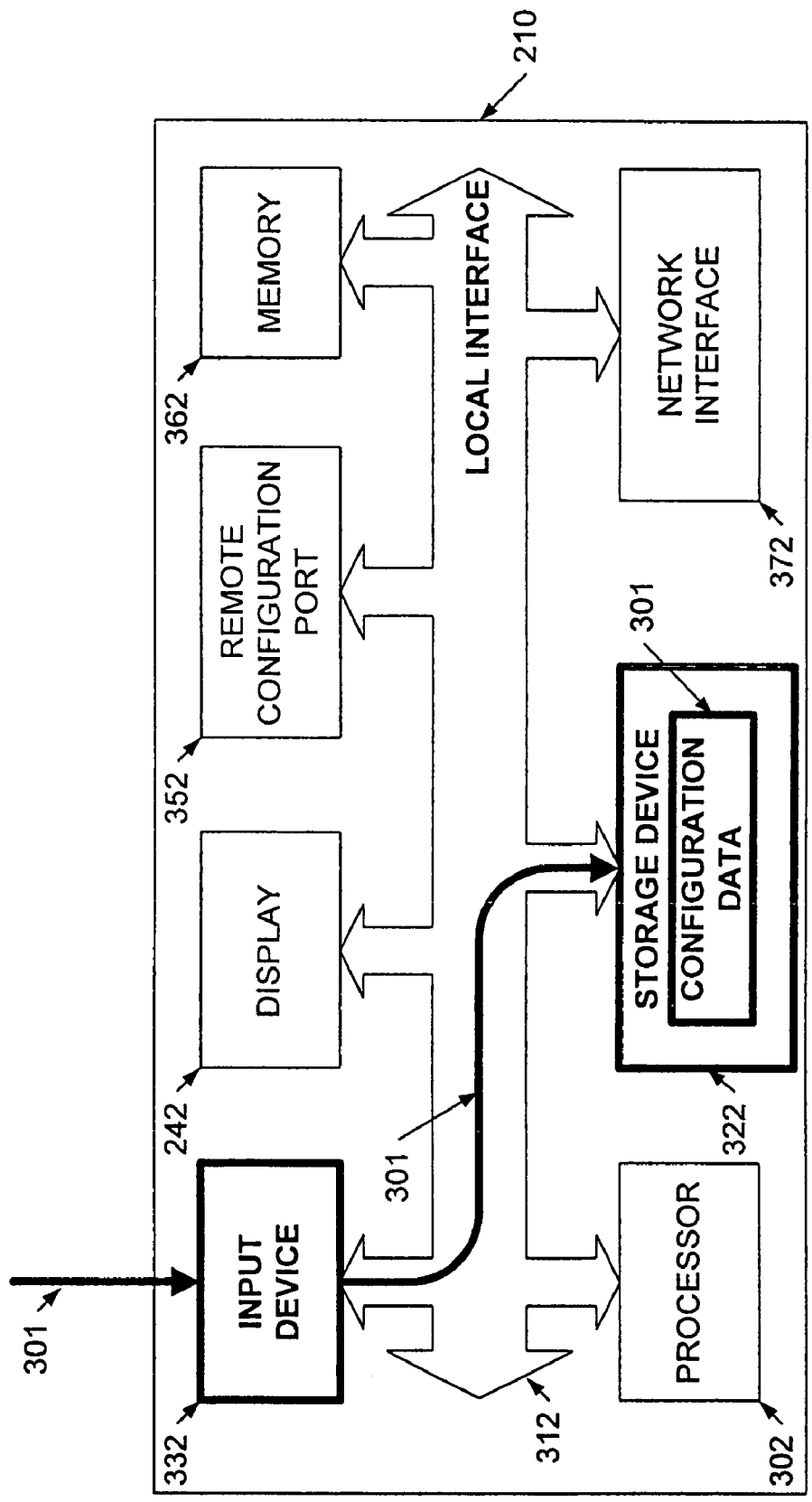
FIG. 3B is a block diagram showing an exploded view of the administration system of FIG. 2 having a direct input mechanism for entering the configuration data of FIG. 3A.

Once the information for configuration data 301 (FIG. 3A) is determined by an administrator, this configuration data may be input to the administration machine 210 (FIG. 2) directly or indirectly. FIG. 3B is a block diagram showing an exploded view of the administration system of FIG. 2 having a direct input mechanism for entering the configuration data of FIG. 3A. In one implementation, the administrator would input the configuration data 301 to the administration machine 210 through an input device 332 (e.g., keyboard), and the configuration data 301 would be transferred through a local interface 312 to be stored on a storage device 322 (e.g., hard disk, floppy disk, CD-ROM, etc.) in a large database or data structure with multiple other instances or "database records" of configuration data 301 specific to other gateway sites 150(0 . . . n). Of course, programming contained in memory 362, preferably loaded from storage device 322, would be executed by a processor 302 to facilitate the entry and storage of the configuration data 301, including a graphical user interface displayed on a display 342 in one implementation. A template is provided and maintained for each gateway site 150(0 . . . n), into which an administrator is able to enter configuration information and settings. Additional programming provides the other functions discussed herein, but other embodiments include additional processors and data storage devices for implementing one or more of the functions described herein. It should be understood, however, that one or more of the functions described herein are omitted in other embodiments of the present invention. Furthermore, the user interface provided to an administrator from the administration machine 210 would preferably be similar to a user interface that would be provide directly at a gateway site 150, except for additional functionality needed at the administration machine 210 to manage multiple instances of configuration data 301. As discussed below, a network interface 372 connects the administration machine 210 to other networks, such as the Internet 130 (FIG. 1A), for sending and receiving electronic mail, as well as receiving the UDP packets discussed above, and a remote configuration port 352 can be used as discussed below.

Figure 3C:
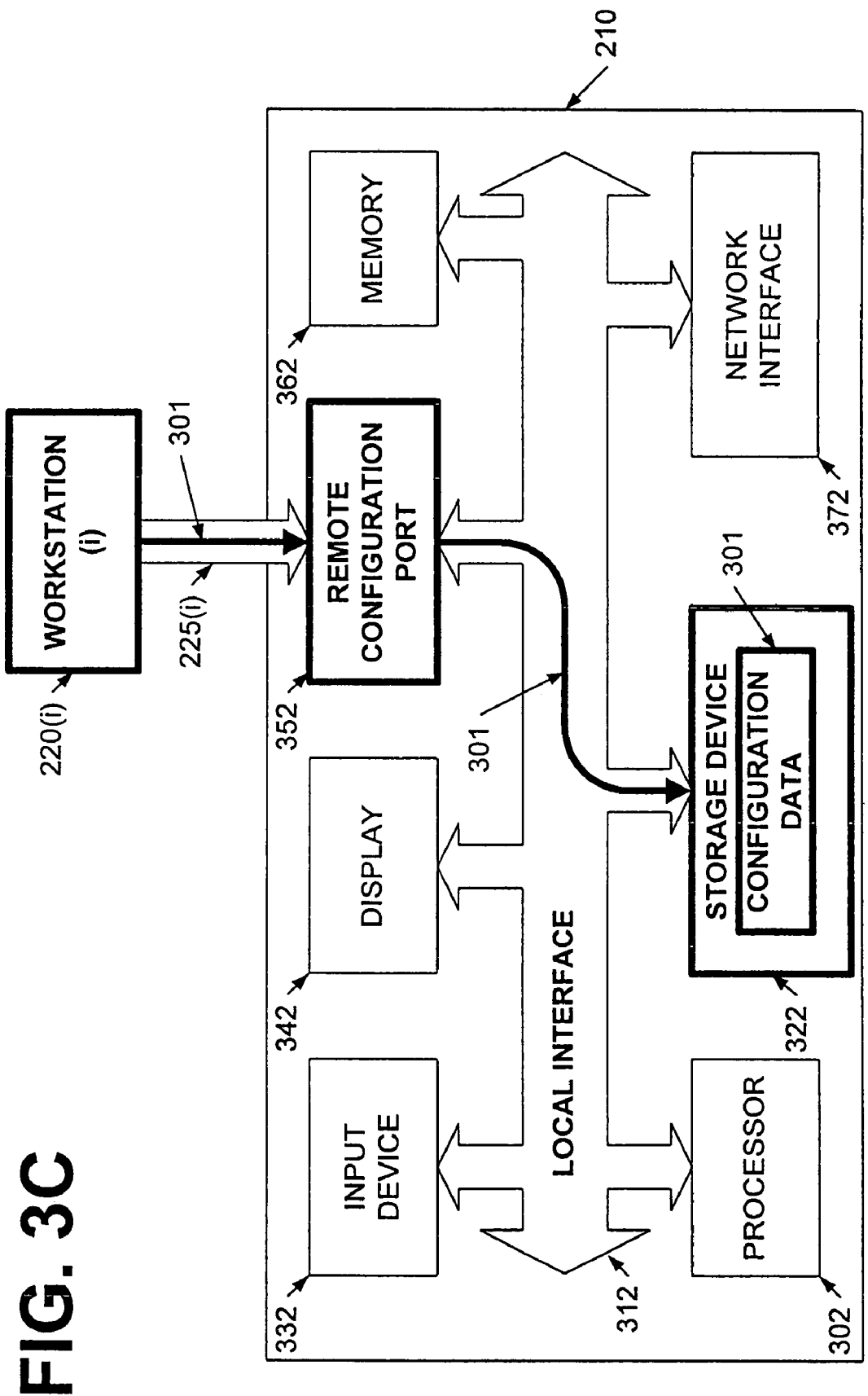
FIG. 3C is a block diagram showing an exploded view of the administration system of FIG. 2 having a remote input mechanism for entering the configuration data of FIG. 3A.

In addition, FIG. 3C shows an exploded view of the administration machine 210 of FIG. 2 having a remote input mechanism for entering the configuration data of FIG. 3A. If the administrator is not physically located at the administration machine 210, the administrator may input the configuration data 301 into the administration machine 210 from a workstation 220($i$) on the LAN of the administration site 110 (FIG. 1B). Here, the remote workstation 220($i$) is connected to a remote configuration port 352 of administration machine 210 through a LAN interface 225($i$). The remote configuration port 352 of the administration machine 210 receives the configuration data 301 from the workstation 220($i$) through a LAN interface 225($i$) and stores the configuration data 301 onto storage device 322 on the administration machine 210. Other embodiments also include providing the functions of the administrative machine 210 in alternate arrangements of hardware. In addition, it is understood that there are many ways of getting configuration information into the configuration data 301, including others not shown in the figures, such as through a remote workstation connected through the network interface 372.

Figure 4:
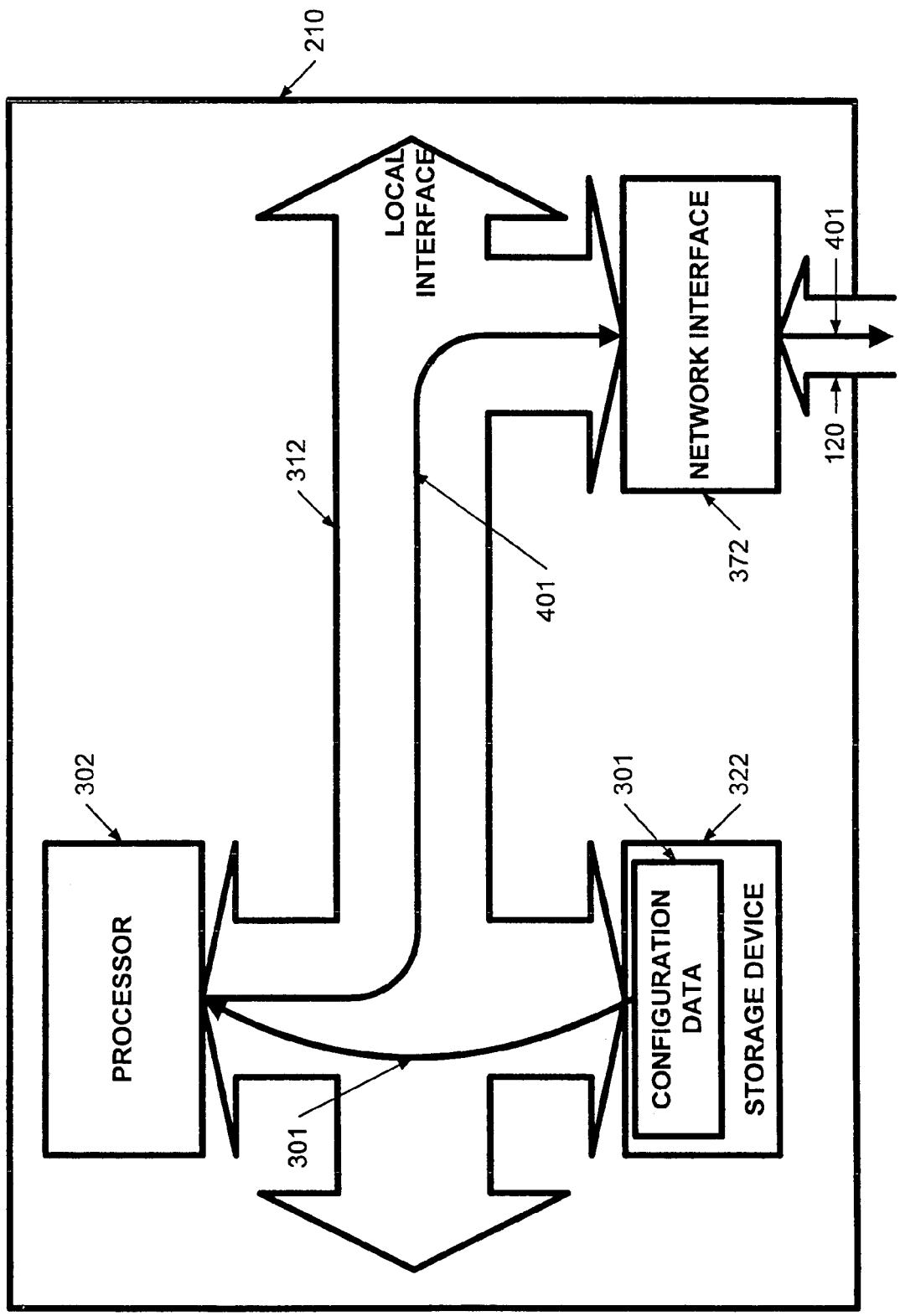
FIG. 4 is a block diagram showing an exploded view of portions of the administration system of FIG. 2 configured to encrypt and transmit the configuration data of FIG. 3A.

Regardless of whether the configuration data 301 is input directly (e.g., FIG. 3B) or indirectly (e.g., FIG. 3C) to the administration machine 210, once the administration machine 210 is ready to reconfigure remote gateway sites 150(0 . . . n) (FIG. 1B), the configuration data 301 needs to be securely placed on a remote mail server 135 (FIG. 1B) for access by the remote gateway sites 150(0 . . . n) (FIG. 1B). FIG. 4 is a block diagram showing an exploded view of portions of the administration system 210 illustrating how it is configured to encrypt and transmit the configuration data 301. The processor 302 on the administration machine 210 accesses the storage device 322 of the administration machine 210 through a local interface 312. The processor 302 retrieves the configuration data 301 from the storage device 322 and encrypts the configuration data 301 to produce an encrypted file 401 for transmission through the network interface 372. While not illustrated explicitly, the encrypted file 401 may be saved on the storage device 322 before being transmitted through the network interface 372.

Although certain encryption techniques are referenced below in accordance with the preferred embodiment of the present invention, it will be clear to one of ordinary skill in the art that inventive aspects of the present invention do not lie in the particular algorithm used to encrypt the configuration data 301. Moreover, since symmetric key encryption/decryption techniques (e.g., the conventional blowfish algorithm) as well as asymmetric key encryption/decryption techniques (e.g., PGP) are well known in the art, such techniques will not be discussed in detail. Suffice it to say that most encryption techniques may be used to encrypt the configuration data 301 to produce the encrypted file 401. In an example encryption of the configuration data 301, the processor 302 determines the recipient of the file 401 and, using a secure hashing algorithm such as a message digest algorithm (MD-5), hashes together recipient identification information (e.g., gateway device serial number) and a password. The result of that hashing is then used as an encryption key in the blowfish algorithm to create an encrypted version of the configuration data 301, which is then preferably conventionally UUencoded to create the (uuencoded) encrypted file 401 and is transmitted through the network interface 372 as part of an SMTP email message created and addressed to a particular gateway site 150(0 . . . n)

by the administration machine 210. Of course, other embodiments of the present invention include virtually any method of transmitting the information in configuration data 301, or other information on administration site 110, through the various polling techniques disclosed herein.

Figure 5:
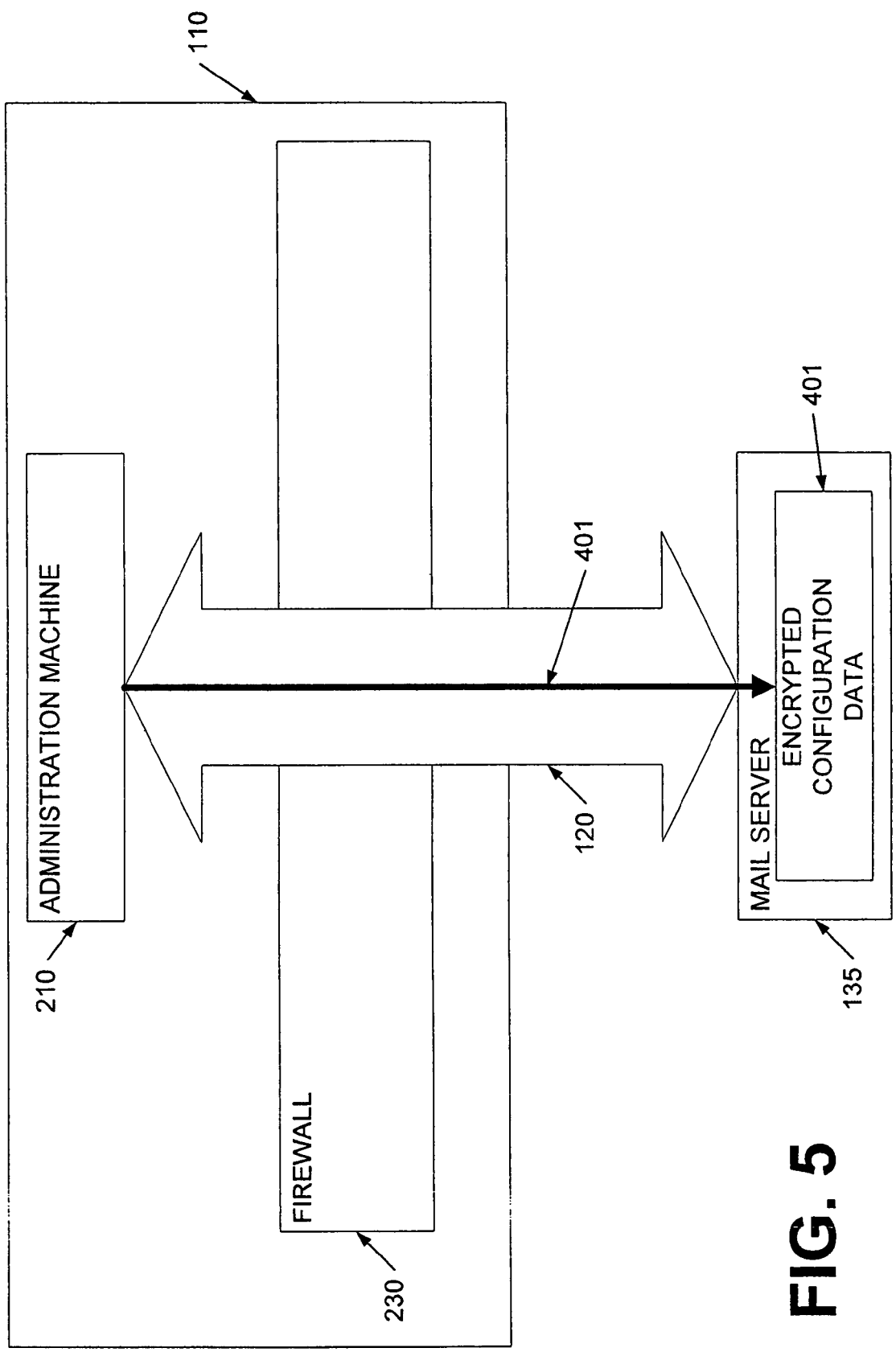
FIG. 5 is a block diagram showing an exploded view of the transmission path of the encrypted configuration data between the administration site and mail server of FIG. 1B.

FIG. 5 is a block diagram showing an exploded view of the transmission path of the encrypted file 401 (and encapsulating email message) between the administration site 110 (FIG. 1B) and the mail server 135 (FIG. 1B). In this embodiment, the mail server 135 (FIG. 1B) is located separately from the administration site 110 (FIG. 1B). Once the processor 302 (FIG. 4) encrypts the file and determines the address of the recipient, the encrypted file 401 is transmitted from the administration machine 210 to the mail server 135 via a communications pathway 120. The mail server 135 stores the encrypted configuration data 401 as part of an email message, which is now ready for retrieval, such as through a conventional post office protocol (POP). As shown by FIG. 5, since the encrypted file 401 is transmitted from the administration machine 210 to the mail server 135 through the firewall 230, no entry path to the administration site 110 is created through the firewall 230 via this path during this time. Hence, the administration site 110 is secure from potential infiltration by undesired intruders (i.e., hackers). Also, since the encrypted file 401 on the mail server 135 is both recipient specific (i.e., the file addressed to a specific recipient) and encrypted, the encrypted file 401 is secure from unauthorized access from the mail server 135 until retrieved by the intended recipient (i.e., the gateway server(s) for which the file was intended). Of course, the firewall 230 may be omitted in some embodiments or incorporated into the administration machine 210.

Figure 6:
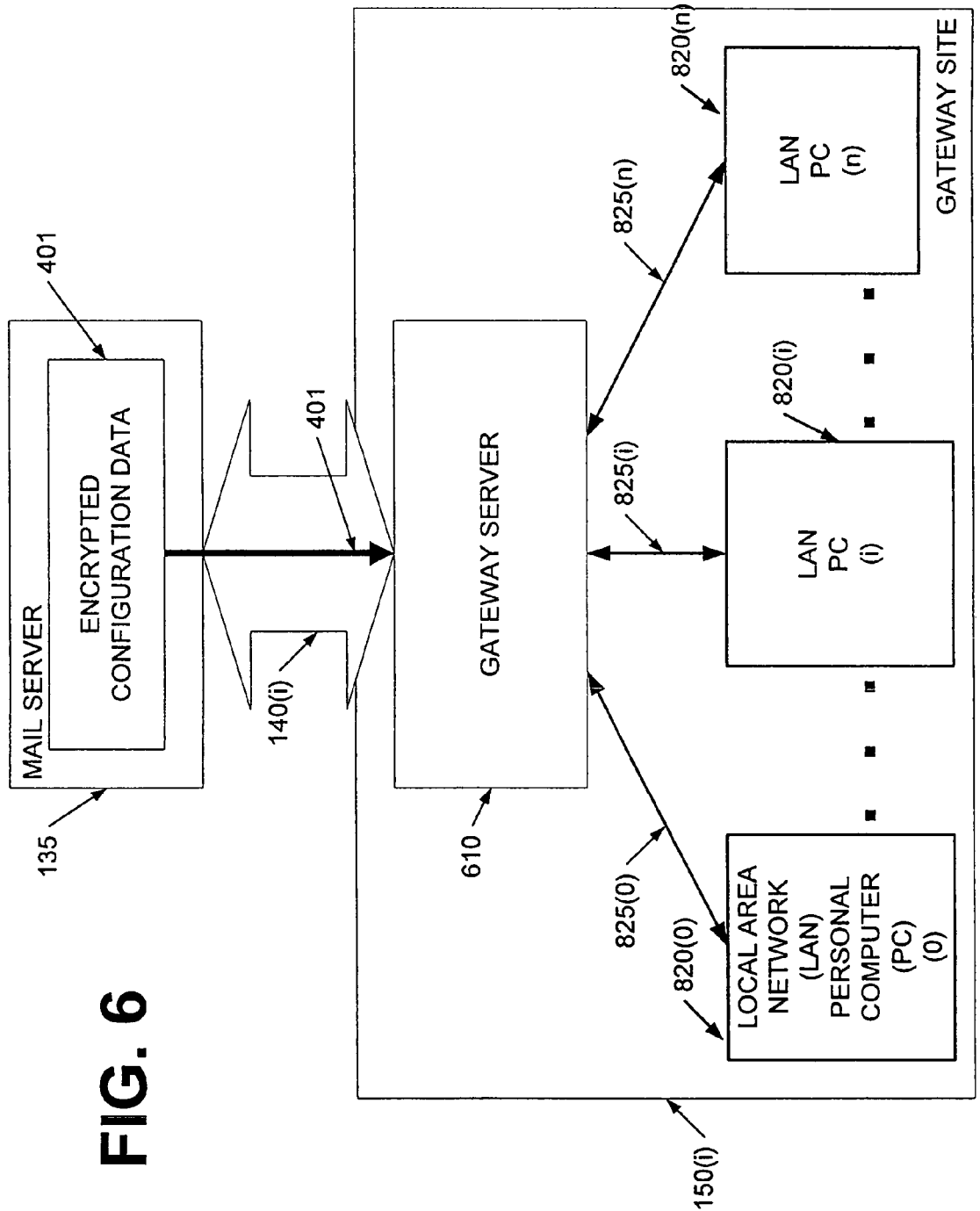
FIG. 6 is a block diagram showing an exploded view of the retrieval path of the encrypted configuration data between the mail server and the gateway site of FIG. 1B.

FIG. 6 is a block diagram showing an exploded view of the retrieval path of the encrypted file 401 once the encrypted file 401 is placed on the mail server 135 by the administration machine 210 (FIG. 5). As discussed in more detail below, a gateway server 610 at the gateway site 150 polls the mail server 135 to determine whether there is a file for the gateway server 610 from the administration machine 210 on the mail server 135 (i.e., whether there is an email for the gateway server from the administrator). Depending on the desired level of security, the mail server 135 may be polled after initialization at irregularly scheduled or evenly spaced periodic intervals (e.g., every 10 minutes), as well as according to other arrangements as necessary, including at initialization, etc. If the gateway server 610 determines that an encrypted file 401 on the mail server 135 is intended for that gateway server 610, then the gateway server 610 retrieves the encrypted file 401 through a communications pathway 140(*i*) between the mail server 135 and the gateway server 610. As shown in FIG. 6, since the gateway server 610 "pulls" a file (i.e., retrieves an encrypted configuration file 401) from the mail server 135, rather than having the file "pushed" to the gateway server 610, there are no open ports which are left vulnerable to attacks by hackers (e.g., denial of service attacks). The remaining elements of FIG. 6 are discussed in more detail in reference to FIG. 8 below.

In architecture, the gateway server 610 may also include a firewall (not shown). The firewall may be external to the gateway server 610 or, alternatively, internal to the gateway server 610 as an integrated portion of the gateway serer 610. In the embodiment having a firewall, the retrieval of the encrypted file 401 would be shielded by the firewall of the gateway server 610. This would allow only authorized exchanges to take place through the firewall, thus, further securing the gateway site 150(*i*) from unwanted intruders.

Figure 7A:
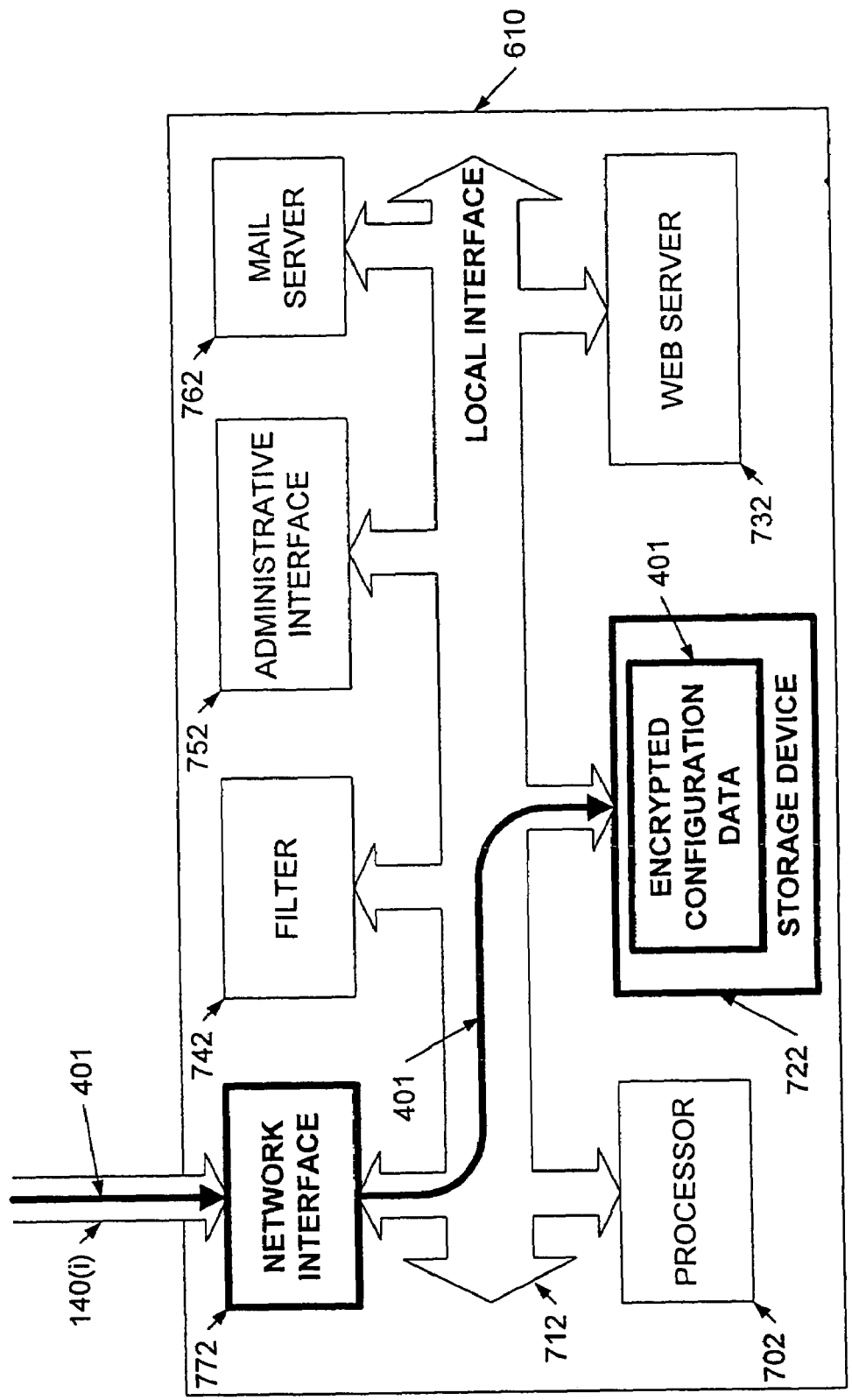
FIG. 7A is a block diagram showing an exploded view of the gateway server of FIG. 6 configured to retrieve the encrypted configuration data from the mail server.

FIG. 7A is a block diagram showing an exploded view of elements of the gateway server 610 of FIG. 6 configured to retrieve the encrypted file 401 (and associated email message) from the mail server 135. A preferred embodiment of the gateway server may comprise, in one embodiment, a network interface 772 (i.e., communications hardware), a high performance processor 702, a storage device 722, a web server 732, a filter 742 (e.g., security measures), a local mail server 762, and an administrative interface 752. Although not shown in FIG. 7A, the gateway server 610 may further comprise a hardware dongle (i.e., a gateway server identification device), which may also be used as an access control device and may include the serial number for the gateway sever 610 discussed above with respect to the MD-5 hashing function. In one embodiment, each gateway server includes high performance processing and communications hardware, a Web server, a mail server, stateful observation packet filtering and proxies for robust security, a Web-based administration interface accessible from the protected LAN, and caching for both the Web server and DNS server, providing faster access to the Internet. Once the gateway server 610 polls the mail server 135 (FIG. 6) and determines that there is an encrypted file 401 from the administration machine 210 (FIG. 2), the encrypted file 401 is retrieved from the mail server 135 by the gateway server 610 through a network interface 772 connected to the communications pathway 140(*i*). The encrypted file 401 is then stored at a storage device 772 on the gateway server 610 and is ready for decrypting and potentially installing, as discussed in more detail below.

Figure 7B:
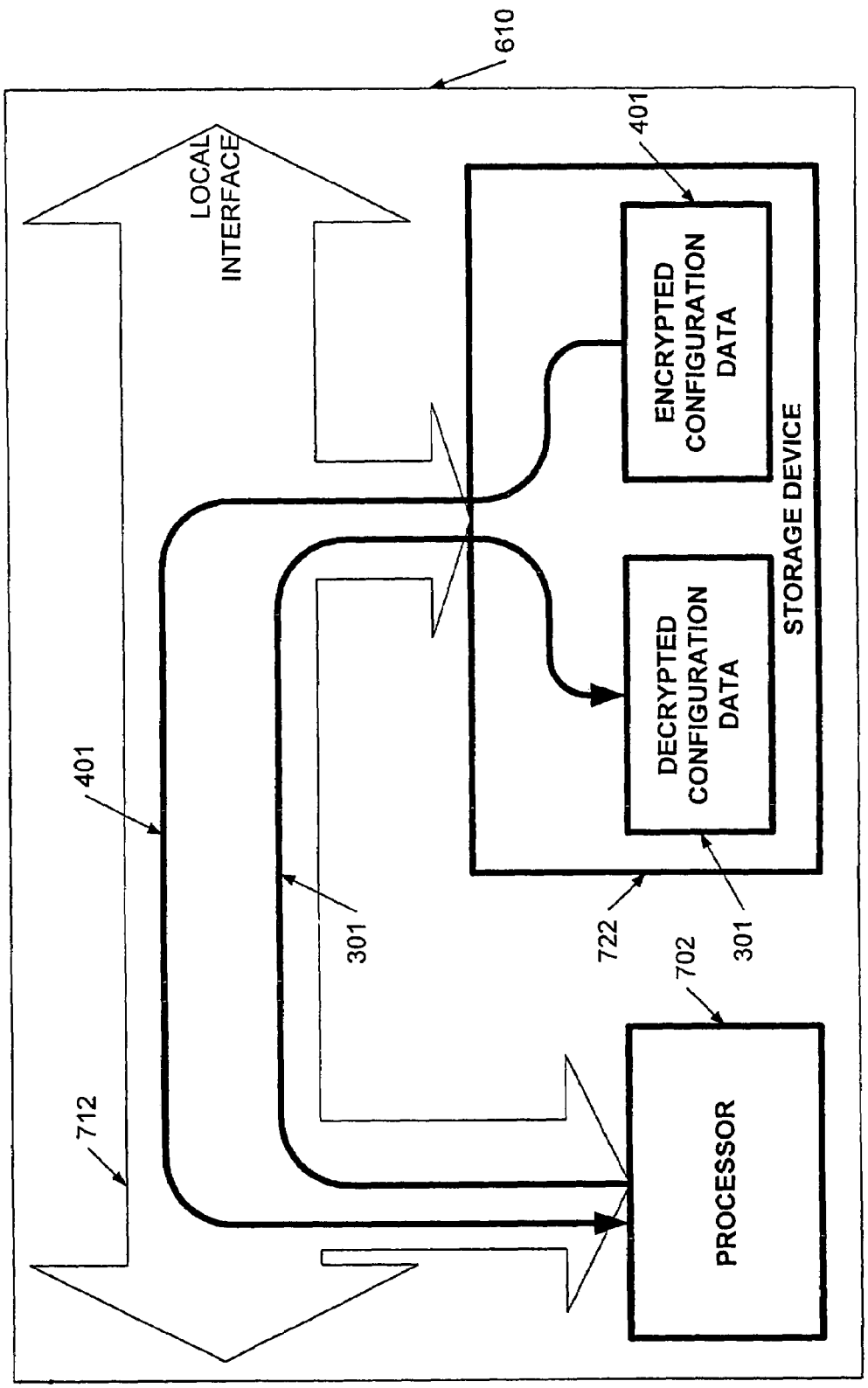
FIG. 7B is a block diagram showing an exploded view of portions of the gateway server of FIG. 6 configured to decrypt the encrypted configuration data.
Figure 7C:
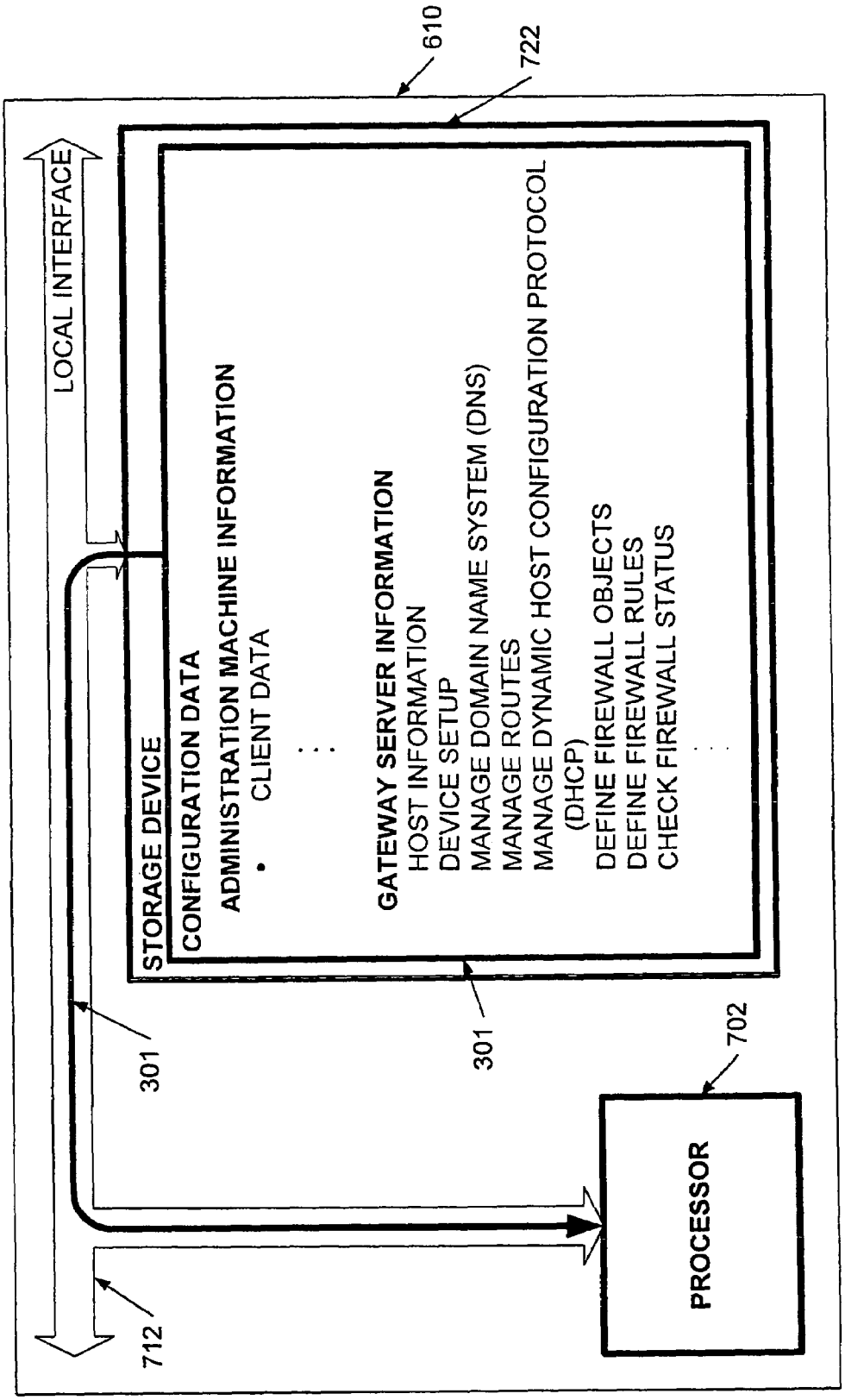
FIG. 7C is a block diagram illustrating the reconfiguration of the gateway server of FIG. 6 according to the configuration data of FIG. 3A.

FIG. 7B is a block diagram showing an exploded view of portions of the gateway server 610 of FIG. 6 configured to decrypt the encrypted file 401. The encrypted file 401 is accessed by a processor 702 via a local interface 712. As discussed in more detail below, the processor 702 UUdecodes the file to convert the ASCII text back to binary. During the UUdecode process, the processor checks for the end-of-file (EOF) marker to make sure that the complete file 401 has been retrieved, and if the complete file has been retrieved, the gateway server 610 further checks to ensure that the result of the UUdecoding is the correct file. If the complete encrypted file 401 is not the correct file, the gateway server 610 sends a message to the administration machine 210 (FIG. 2) alerting the administration machine 210 (FIG. 2) that the wrong file has been received by the gateway server 610. Once it has determined that the complete (and correct) file 401 has been retrieved, the processor 702, then, decrypts the encrypted file 401 using the appropriate decryption algorithm to produce decrypted configuration data 301. Since symmetric key encryption/decryption techniques (e.g., blowfish algorithm) as well as asymmetric key encryption/decryption techniques (e.g., PGP) are well known in the art, such techniques will not be discussed further. Suffice it to say that whichever encryption technique was used to encrypt the configuration data 301 (FIG. 4), the corresponding decryption technique is used here by the processor 702 to decrypt the encrypted file 401 to produce the decrypted configuration data 301. This decrypted configuration data 301 is then stored on the storage device 722 of the gateway server 610. Upon successful decryption of the encrypted file 401, including authenticating that the message is from the administration machine 210 (FIG. 2), the gateway server 610 is configured to notify the administration machine 210 (FIG. 2) of successful decryption. Alternatively, if decryption is unsuccessful, the gateway server 610 is configured to notify the administration machine 210 (FIG. 2) of unsuccessful decryption. In addition, as further discussed below, the gateway server 610 also notifies the administration machine 210 (FIG. 2) if the received configuration data 301 does not contain the correct data corresponding to that type of gateway server 610.

FIG. 7C is a block diagram illustrating the reconfiguration of the gateway server of FIG. 6 according to the configuration data of FIG. 3A (though only a portion of the example data categories are shown in FIG. 7C). As mentioned above in FIG. 3A, the information in the configuration data 301 determines the setting of various parameters of the proper functioning of the gateway server 610 vis-à-vis the Internet 130, in the preferred embodiment. Once the decrypted configuration data 301 provides the relevant information to the gateway server 610, the gateway server 610 reconfigures its system settings in accordance with the information in the configuration data 301. The importance of resetting certain configuration parameters is that, when the administration machine 210 (FIG. 2) becomes aware of a security breach, one way to remedy the breach is by reconfiguring the gateway server 610. For example, if the administration machine 210 (FIG. 1B) is aware of a firewall breach at a gateway site 150(i) (FIG. 1B), the administration machine 210 (FIG. 1B) may redefine firewall rules to remedy that breach. Also, in order to increase security, the administration machine 210 (FIG. 1B) may routinely reconfigure each unit's parameters such as, but not limited to, host information, devise setup parameters, file sharing protocols, as well as a plethora of other parameters (see, for example, FIG. 3A and APPENDIX A of the provisional application by reference above). By routinely (or periodically) changing these parameters, the administration machine 210 (FIG. 1B) decreases security risks associated with the gateway server 610 (FIG. 6). It will be clear to one of ordinary skill in the art that the example configuration information in the incorporated data is not intended to limit the invention to only those parameters included in the example data. To the contrary, it is intended that, among other data, all parameters related to the configuration (or reconfiguration) be included in the scope of the present invention. Continuing, once the gateway server 610 is reconfigured according to the parameters in the configuration data 301, the gateway server 610 notifies the administration machine 210 (FIG. 2) of the successful reconfiguration. Alternatively, if reconfiguration is unsuccessful, the gateway server 610 notifies the administration machine 210 (FIG. 2) of unsuccessful reconfiguration. In essence, the "pull" system embodied by this invention is configured to apprise the administration machine 210 (FIG. 2) of the status of retrieval (FIGS. 6 and 7A), decryption (FIG. 7B), and reconfiguration (FIG. 7C) of the gateway server 610.

Figure 8:
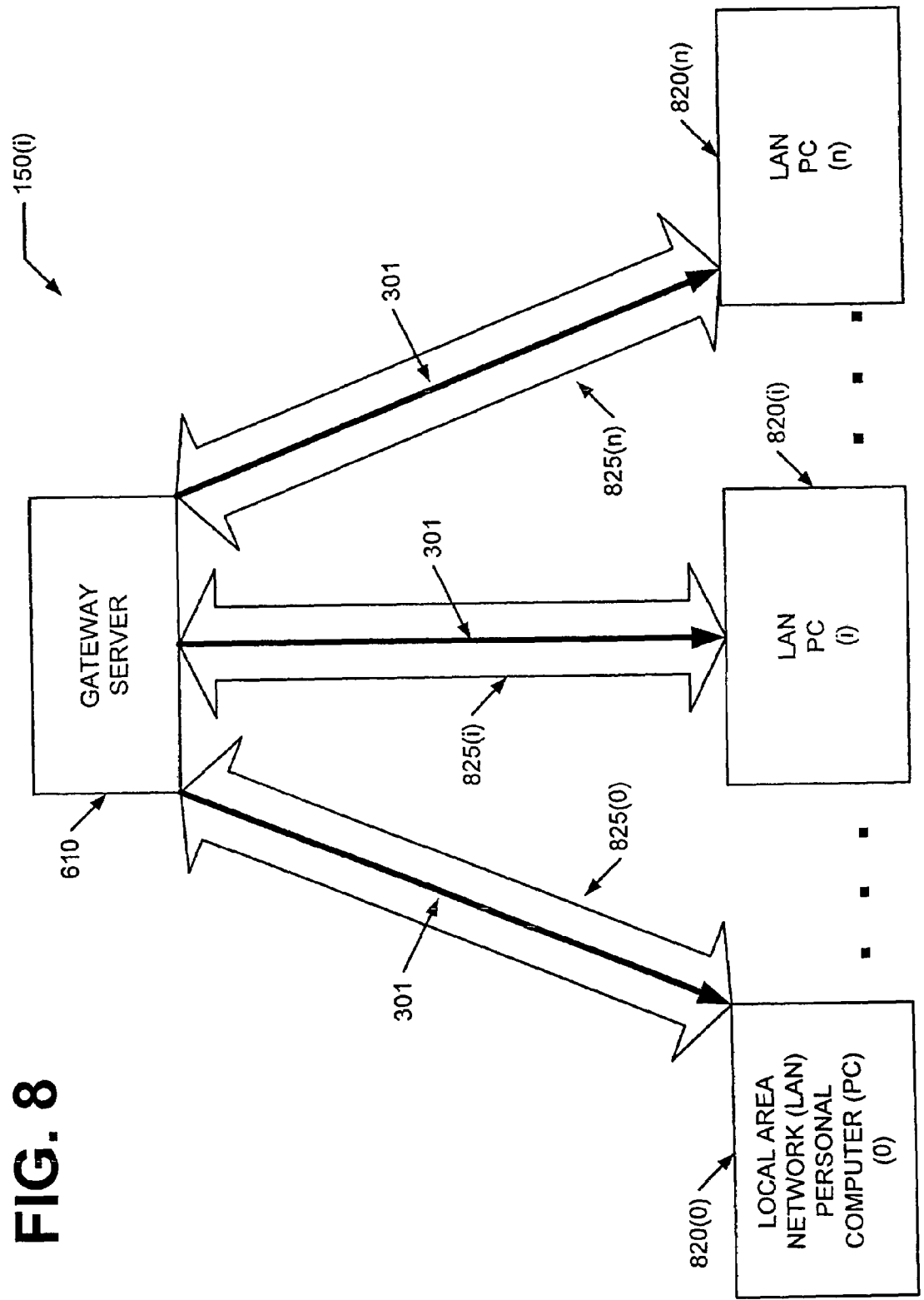
FIG. 8 is a block diagram illustrating the reconfiguration of local area network personal computers in accordance with the reconfiguration of the gateway server in FIG. 7C.

Once the gateway server 610 is reconfigured, further reconfiguration of personal computers (PC) 820(0 . . . n) at the gateway site 150(i) may be desired. FIG. 8 is a block diagram illustrating the reconfiguration of LAN-PCs 820(0 . . . n) in accordance with the reconfiguration of the gateway server 610. If the information in the configuration data 301 is pertinent to the operation of the LAN (i.e., the gateway site 150(i) (FIG. 1B)), then the configuration data 301 (or a portion thereof) is transmitted from the gateway server 610 to the LAN-PCs 820(0 . . . n) in order for the individual LAN-PCs 820(0 . . . n) to be reconfigured accordingly. As shown from FIGS. 1A through 8, the system of the present invention 100 (FIG. 1B) allows for secure management and monitoring of remote gateway sites 150(0 . . . n) (FIG. 1B) by an administration site 110 (FIG. 1B). Since the system allows for a "pulling" (rather than a "pushing") of configuration information, much of the security risks associated with traditional methods of reconfiguring remote gateway sites is eliminated.

Figure 9:
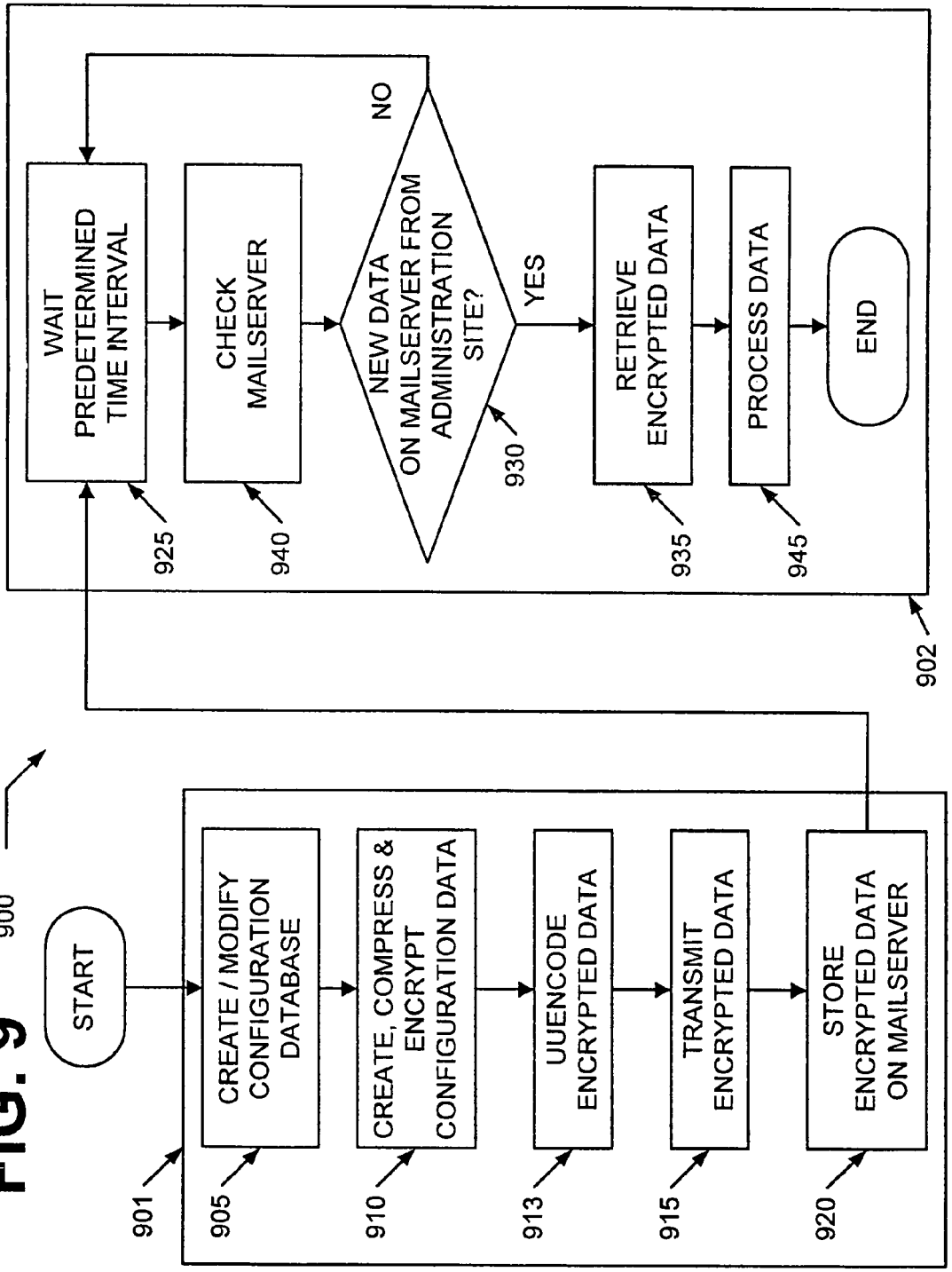
FIG. 9 is a flow chart illustrating portions of an example method implemented by the system of FIGS. 6, 7A, 7B, and 7C.

In addition to the system (as described above), a method for securely managing and monitoring remote gateway sites 150(0 . . . n) (FIG. 1B) by an administration site 110 (FIG. 1B) is taught. FIG. 9 is a flow chart illustrating portions of a method 900 implemented by the system 100 described in FIGS. 1A through 8. Broadly conceptualized, the method 900 may be separated into administration site method steps 901, which compromise steps taken by the administration site 110 (FIG. 1B), and gateway site method steps 902, which compromise steps taken by the gateway site 150(0 . . . n) (FIG. 1B). One embodiment of the administration site method steps 901 may be viewed as follows. First, the administration machine 210 (FIG. 2) creates or modifies, in step 905, configuration data 301 (FIG. 3A) as part of a larger configuration database and identifies a specific recipient (i.e., a gateway server 610 (FIG. 6)) to be reconfigured. As discussed above, in one implementation, step 905 takes place in conjunction with an administrator operating the administration machine 210 to edit configuration information for a gateway site 150(0 . . . n) (FIG. 1B) and initiate the update process. Next, the administration machine 210 (FIG. 2), in step 910, automatically creates one or more configuration files to include the configuration data 301 (FIG. 4) for that particular gateway site 150(0 . . . n) (FIG. 1B), compresses the configuration data 301, and encrypts the compressed configuration data 301 to produce an encrypted file 401 (FIG. 4). In one implementation, the configuration files that are compressed through one of a variety of conventional compression algorithms include a dump file from the larger configuration database for a particular gateway site 150(0 . . . n) and a key file that are joined together before compression, such as through the common TAR (tape archive) Unix utility process. Of course, additional files could also be included in the joining process. In step 910, gateway server identification information (e.g., serial number of the gateway server or dongle) is hashed together with a password known by both the administration machine 210 (FIG. 5) and the gateway server 610 (FIG. 6) (e.g., MD-5 hash) to obtain a key that is then used in an encryption algorithm, such as the Blowfish algorithm. This encrypted file is then UUencoded, in step 913, for transmission. The encrypted file 401 (FIG. 4) is transmitted, in step 915, from the administration machine 210 (FIG. 5) to a mail server 135 (FIG. 5). The mail server 135 (FIG. 5) stores, in step 920, the encrypted file 401 (FIG. 5).

One embodiment of the gateway site method steps 902 illustrates the steps taken by an example gateway site 150 (0 . . . n) in retrieving and installing the configuration data 301 (i.e., reconfiguring the gateway server 610 (FIG. 6)). Here, after waiting for a predetermined amount of time in step 925, the gateway server 610 (FIG. 6) checks, in step 940, the mail server 135 (FIG. 6) to see whether there is a new file on the mail server 135 (FIG. 6) from the administration site (FIG. 1B). If the gateway server 610 (FIG. 6) determines, in step 930, that there is no new file on the mail server 135 (FIG. 6), then the gateway server 610 (FIG. 6) waits again, in step 925, for the predetermined time interval and then checks, in step 940, the mail server 135 (FIG. 6) again. If, on the other hand, the gateway server 610 (FIG. 6) determines, in step 930, that there is a new file on the mail server 135 (FIG. 6) from the administration machine (FIG. 5), then the gateway server 610 retrieves, in step 935, the encrypted file 401 (FIG. 6) from the mail server 135 (FIG. 6). Upon retrieval 935 of the file, the gateway server processes, in step 945, the received file, thus, potentially reconfiguring the gateway site 150(i) in accordance with predefined processes and parameters in the received file.

Figure 10:
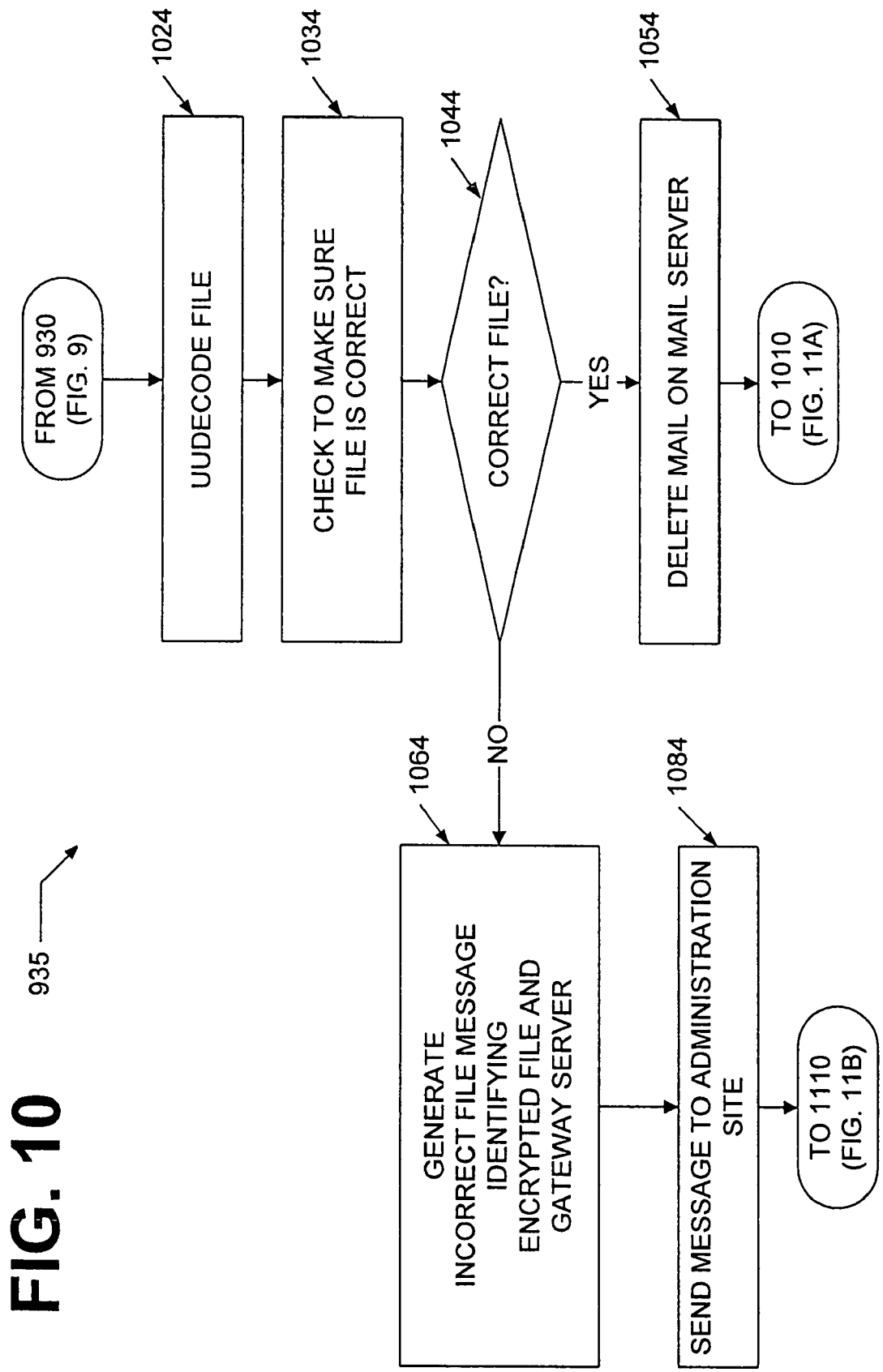
FIG. 10 is a flow chart illustrating the file retrieval step of FIG. 9 in more detail.

FIG. 10 is a flow chart illustrating the retrieval step 935 of FIG. 9 in more detail. In this embodiment, once the file has been retrieved 935 and placed on the gateway server 610 (FIG. 6), the gateway server 610 UUdecodes the file, in step 1024. In UUdecoding 1024 the file, the gateway server 610 (FIG. 6) checks for the end-of-file (EOF) marker to ensure that the entire file is present, including combining the contents of multiple email messages if necessary. After UUdecoding 1024 the received file, the gateway server 610 (FIG. 6) checks, in step 1034, the UUdecoded encrypted file to make sure that the filename is an expected name stored on the gateway server 610, which provides another security mechanism and may reconfigured. If the gateway server process determines, in step 1044, that the correct file has been sent to the correct gateway server 610 (FIG. 6), then the gateway server 610 (FIG. 6) transmits instructions to delete, in step 1054, the mail on the mail server 135 (FIG. 6). If, on the other hand, the gateway server determines 1044 that there is a mismatch, the gateway server 610 (FIG. 6) generates, in step 1064, a message stating that the incorrect file was delivered to that gateway server 610 (FIG. 6). The gateway server 610 (FIG. 6) then sends, in step 1084, the message generated in step 1064 to the administration machine 210 (FIG. 2) alerting the administration machine 210 (FIG. 2) of the mismatch, which, like other messages received by the administration machine 210, also provides an intrusion indication if such messages were not prompted by the administration machine 210.

FIG. 11A is a flow chart illustrating the processing step 945 of FIG. 9 in more detail, including possibly reconfiguring the gateway server 610 (FIG. 6). Once the gateway server 610 (FIG. 6) retrieves 935 the file, the gateway server 610 (FIG. 6) decrypts and decompresses, in step 1010, the encrypted file 401 (FIG. 6) using the appropriate decryption and decompression algorithms as discussed above (i.e., the decryption and decompression algorithms associated with the encryption step 910 of FIG. 9). In addition, if multiple files were joined together before compression at the administration machine 210, the initial files are split back out into separate files. In decrypting, for example, the gateway server 610 (FIG. 6) could hash its serial number together with an expected password to obtain a key that is then used in the blowfish algorithm to decrypt the UUdecoded encrypted file. The gateway server 610 (FIG. 6) then determines, in step 1020, whether the gateway server 610 (FIG. 6) successfully decrypted the encrypted file 401 (FIG. 6). If the gateway server 610 (FIG. 6) determines 1020 that decryption was unsuccessful, then the gateway server 610 (FIG. 6) generates, in step 1055, an unsuccessful decryption message identifying the encrypted file and the gateway server 610. This message is then transmitted, in step 1060, to the administration machine 210 (FIG. 2).

If, on the other hand, the gateway server 610 (FIG. 6) determines 1020 that decryption was successful, including authenticating the message, then the gateway server 610 (FIG. 6) further determines, in step 1030, whether the decrypted file is the correct configuration data 301 (FIG. 7C). For example, such could be done by analyzing data to determine if the configuration data 301 corresponds to the correct type of gateway server 610, such as by examining a box type field in the configuration data, serial number, etc. If the gateway server 610 (FIG. 6) determines 1030 that the configuration data 301 (FIG. 7C) is incorrect, then the gateway server 610 (FIG. 6) generates, in step 1035, an incorrect configuration data message identifying the decrypted configuration data and the gateway server 610 (FIG. 6). This message is then transmitted, in step 1060, to the administration machine 210 (FIG. 2).

If, in step 1030, the gateway server 610 (FIG. 6) determines that the correct configuration data 301 (FIG. 7C) has been received, the gateway server 610 (FIG. 6) executes install programs, in step 1040, to install the decrypted configuration data 301 (FIG. 7C). The installation 1040 may entail a "cold" install (i.e., an installation involving the rebooting of the gateway server 610 (FIG. 6)) or, alternatively, a "warm" install (i.e., an installation without rebooting). In either case, the gateway server 610 (FIG. 6) first updates its highly accessible and searchable repository, i.e., a database, before generating pertinent configuration files for use by applications and other executables on the gateway server 610 during installation 1040 of the configuration data 301 (FIG. 7C). Of course, other embodiments include avoiding any central repository or database, including simply writing downloaded configuration information to appropriate locations in the gateway server 610 (FIG. 6). The gateway server 610 (FIG. 6) then preferably updates, in step 1045, itself and the LAN at the gateway site 150(*i*) (FIG. 1B) by adding users and devices that should remain unchanged by the newly installed configuration data 301 (FIG. 7C). The gateway server 610 (FIG. 6) then generates, in step 1040, a successful installation email message including the configuration data. This message is then transmitted, in step 1060, to the administration machine 210 (FIG. 2). Of course, other embodiments of the present invention include generating such an email message between steps 1030 and 1040, and other embodiments include omitting step 1045.

Figure 11B:
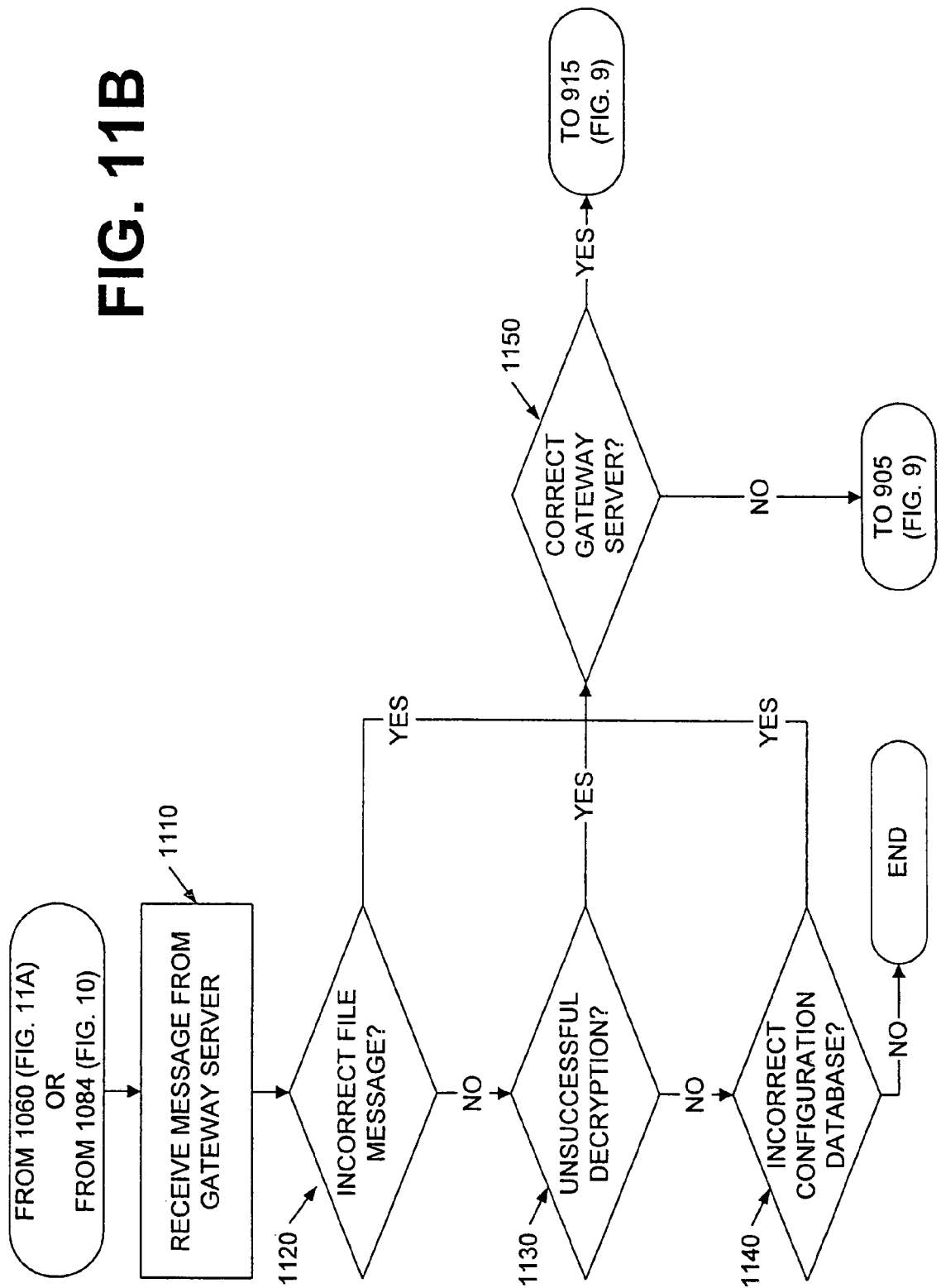
FIG. 11B is a flow chart illustrating the method of confirming correct installation by the administration machine.

FIG. 11B is a flow chart illustrating a method for confirming the reconfiguration of the gateway server 610 (FIG. 6) by the administration machine 210 (FIG. 2). Once the gateway server 610 (FIG. 6) transmits 1060 (FIG. 11A), or 1084 (FIG. 10), a message to the administration machine 210 (FIG. 2), the administration machine 210 (FIG. 2) receives, in step 1110, the message from the gateway server 610 (FIG. 6). Upon receiving 1110 the message, the administration machine 210 (FIG. 2) determines, in step 1120, whether the message is an incorrect file message. If the administration machine 210 (FIG. 2) determines, in step 1120, that an incorrect file was transmitted 913 (FIG. 9), the administration machine further determines, in step 1150, whether the correct file was transmitted 913 (FIG. 9) to correct gateway server 610 (FIG. 6). If it is determined 1150 that the correct file was transmitted to the correct gateway server 610 (FIG. 6), the administration machine 210 (FIG. 2) transmits 915 (FIG. 9), again, the file to the gateway server 610 (FIG. 6). If, however, in step 1150, it is determined that the file or gateway server 610 (FIG. 6) is incorrect, then the administration machine 210 (FIG. 2) modifies 905 (FIG. 9) the configuration data 301 (FIG. 3A) as necessary and repeats the steps of FIG. 9.

If, in step 1120, the administration machine 210 (FIG. 2) determines that a correct file was transmitted 913 (FIG. 9), the administration machine 210 (FIG. 2) further determines, in step 1130, whether the decryption 1010 (FIG. 11A) was successful. If it is determined that the decryption 1010 (FIG. 11A) was unsuccessful, the administration machine 210 (FIG. 2) determines, in step 1150, whether the correct file was transmitted 913 (FIG. 9) to the correct gateway server 610 (FIG. 6). If it is determined 1150 that the correct file was transmitted 915 (FIG. 9) to the correct gateway server 610 (FIG. 6), the administration machine 210 (FIG. 2) transmits 915 (FIG. 9), again, the file to the gateway server 610 (FIG. 6). If, however, in step 1150, it is determined that the file or gateway server 610 (FIG. 6) is incorrect, then the administration machine 210 (FIG. 2) modifies 905 (FIG. 9) the configuration data 301 (FIG. 3A) and repeats the steps of FIG. 9.

If, in step 1130, the administration machine 210 (FIG. 2) determines that the decryption 1010 (FIG. 11A) was successful, then it further determines, in step 1140, whether the correct configuration data 301 (FIG. 7C) has been installed 1040 (FIG. 11A). If it is determined 1140 that the incorrect data has been received, the administration machine 210 (FIG.

2) determines, in step 1150, whether the correct file was transmitted 913 (FIG. 9) to the correct gateway server 610 (FIG. 6). If it is determined 1150 than the correct file was transmitted 915 (FIG. 9) to the correct gateway server 610 (FIG. 6), the administration machine 210 (FIG. 2) transmits 915 (FIG. 9), again, the file to the gateway server 610 (FIG. 6). If, however, in step 1150, it is determined that the file or gateway server 610 (FIG. 6) is incorrect, then the administration machine 210 (FIG. 2) modifies 905 (FIG. 9) the configuration data 301 (FIG. 3A) and repeats the steps of FIG. 9. If, in step 1140, the administration machine 210 (FIG. 2) determines that the correct configuration data 301 (FIG. 7C) has been received, and presumably installed 1040 (FIG. 11A), the process ends until the administrator desires to update the gateway server's 610 (FIG. 6) configuration data 301 (FIG. 7C).

FIG. 12 is a flow chart 1200 illustrating a method of monitoring the gateway servers 610 (FIG. 6) by the administration machine 210 (FIG. 2). This method, similar to the configuration method (FIGS. 9, 10, 11A, and 11B), may be viewed as gateway method steps 1201 (i.e., a method employed by the gateway server 610 (FIG. 6)) and administration method steps 1202 (i.e., a method employed by the administration machine 210 (FIG. 2)). The gateway server 610 (FIG. 6) periodically generates, in step 1210, a message having gateway identification information, the time of the latest update, and the configuration data from the latest update. This message is then transmitted, in step 1220, from the gateway server 610 (FIG. 6) to the administration machine 210 (FIG. 2). The transmission of the message may be done via email through the mail server 135 (FIG. 1B). In the preferred embodiment, this is an addition to the information used merely to inform the administration machine 210 (FIG. 2) of the active status of the gateway server 610 (FIG. 6) through user datagram protocol (UDP) packets. The administration machine 210 (FIG. 2) receives, in step 1230, the message from the gateway server 610 (FIG. 6) and determines, in step 1240, whether the gateway server 610 (FIG. 6) is correctly configured with the latest configuration data. If the administration machine 210 (FIG. 2) determines 1240 that all the information is correct (i.e., the latest configuration data is correctly installed on the gateway server 610 (FIG. 6)), then the process ends until the administrator wishes to reconfigure the gateway server 610 (FIG. 6). If, on the other hand, the administration machine 210 (FIG. 2) determines 1240 that the gateway server 610 (FIG. 6) is incorrectly configured, then the administration machine 210 (FIG. 2) reconfigures the gateway server 610 (FIG. 6) by going through the reconfiguration process of FIG. 9.

As seen from FIGS. 9 through 12, this method, in one implementation, allows for reconfiguration and management of remote gateway servers through configuration data created 905 (FIG. 9), encrypted 910 (FIG. 9), and transmitted 915 (FIG. 9) by an administration machine 210 (FIG. 2), and subsequently retrieved 935 (FIG. 9) by a gateway server 610 (FIG. 6) for processing 945 (FIG. 9). The "pulling" of files from a remote platform (e.g., mail server 135 (FIG. 1B)) allows for the secure management of remote gateway servers. Moreover, the steps of generating messages by the gateway server 610 (FIG. 6) for the administration machine 210 (FIG. 2) allows for the remote monitoring of the gateway sites 150(0 . . . n) (FIG. 1B) by the administration machine 210 (FIG. 2). This method 900 provides a simple, yet secure, method of managing and monitoring remote gateway sites 150(0 . . . n) (FIG. 1B) by the "pulling", rather than the "pushing", of configuration information from a remote platform by the gateway sites 150(0 . . . n) (FIG. 1B).

Any process descriptions or blocks in flow charts should be understood as representing modules, segments, or portions of code which include one or more executable instruction for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, one or more steps may be omitted or combined with others steps in other embodiments. The programming discussed herein, which comprises an ordered listing of executable instructions for implementing logical functions, can be, without limitation, embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic),a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should also be clearly understood that the scope of the present invention includes virtually any device that can receive configuration information, such as through e-mail. Besides gateway servers, automated teller machines, etc., other devices in the very wide area could include, without limitation, refrigerators having network access, network printers, etc.

While particular embodiments of the invention have been disclosed in detail in the foregoing description and drawings for purposes of example, it will be understood by those skilled in the art that variations and modifications thereof can be made without departing from the scope of the invention as set forth in the following claims.

Now that the invention has been described,
What is claimed is:
1. A system providing secure communication between network devices, the system comprising:
   an administration site structured to create at least one file,
   a mail server disposed in a communicative relationship with said administration site,
   a first communications pathway established between said administration site and said mail server,
   said administration site structured to push said at least one file to said mail server via standard mail transfer protocol, a gateway site disposed in a communicative relationship with said mail server, a second communications pathway established between said gateway site and said mail server, said gateway site structured to pull said at least one file from said mail server via standard mail transfer protocol, without establishing a direct communications pathway between said administration site and said gateway site to transmit or retrieve said at least one file, and said gateway site further structured to eliminate a communications pathway for unauthorized access by eliminating a need to monitor for an incoming request for reconfiguration from said administration site.

2. The system as recited in claim 1 wherein said mail server is an accessible email server.

3. The system as recited in claim 1 wherein the at least one file includes configuration data.

4. The system as recited in claim 3 wherein said gateway site is further structured to reconfigure itself in accordance with said configuration data.

5. The system as recited in claim 4 wherein said at least one file comprises an encrypted file.

6. The system as recited in claim 1 wherein said gateway site is further structured to periodically poll said mail server to identify the presence of said at least one file.

7. A system to permit secure and remote management of gateway servers, the system comprising:

an administrative machine structured to create at least one encrypted configuration file, a remote mail server disposed in a communicative relationship with said administrative machine, a first communications pathway established between said administrative machine and said remote mail server, said administrative machine structured to push said at least one encrypted configuration file to said remote mail server via standard mail transfer protocol, at least one remote gateway server disposed in a communicative relationship with said remote mail server, a second communications pathway established between said remote gateway server and said at least one remote mail server, said at least one remote gateway server structured to pull said at least one encrypted configuration file from said remote mail server via standard mail transfer protocol, without establishing a direct communications pathway between said administrative machine and said at least one remote gateway server, and said at least one remote gateway server further structured to periodically transmit a message via said remote mail server to said administrative machine to confirm configuration parameters of said at least one remote gateway server.

8. The system as recited in claim 7 wherein said remote gateway server is further structured to eliminate a communications pathway for unauthorized access by not opening a port to monitor for an incoming request for reconfiguration from said administrative machine.

9. The system as recited in claim 7 further comprising a plurality of remote gateway servers.

10. The system as recited in claim 7 wherein said at least one remote gateway server is disposed in a communicative relationship with a local area network.

11. The system as recited in claim 10 wherein said at least one remote gateway server is structured to reconfigure at least one device connected to said local area network in accordance with said at least one encrypted configuration file.

12. The system as recited in claim 10 wherein said at least one remote gateway server is structured to reconfigure a plurality of devices connected to said local area network in accordance with said at least one encrypted configuration file.

13. A method for securely configuring at least one remote gateway server comprising:

creating an encrypted configuration file at an administration site, pushing the encrypted configuration file from the administration site to a remote mail server via standard mail transfer protocol, polling the remote mail server periodically to identify the presence of the encrypted configuration file and eliminating an open port at the remote gateway server to monitor for an incoming request for reconfiguration from the administration site, pulling the encrypted configuration file from the remote mail server to a remote gateway server via standard mail transfer protocol, decrypting the encrypted file on the remote gateway server, reconfiguring at least one configuration parameter of the remote gateway server in accordance with the configuration file, and periodically transmitting a message from the remote gateway server to the administration site via the remote mail server to confirm the remote gateway server is operating correctly.

14. The method as recited in claim 13 further comprising eliminating a direct communication pathway between the administration site and the remote gateway server to transmit the encrypted configuration file from the administration site to the remote gateway server.

15. The method as recited in claim 13 further comprising creating a confirmation message upon successful reconfiguration of the remote gateway server and transmitting the confirmation message from the remote gateway server to the administration site via the remote mail server.

16. The method as recited in claim 15 further comprising generating a configuration failure message when no confirmation message is received by the administration site within a predetermined time period after pushing the encrypted configuration file to the remote mail server from the administration site.

17. The method as recited in claim 13 further comprising generating a message when an incorrect encrypted configuration file is pulled from the remote mail server by the gateway server and transmitting the message from the remote gateway server to the administration site via the remote mail server.

18. The method as recited in claim 13 further comprising generating a message when decryption of the encrypted configuration file pulled from the remote mail server to the gateway server is unsuccessful and transmitting the message from the remote gateway server to the administration site via the remote mail server.

19. The method as recited in claim 13 further comprising generating a user datagram protocol packet at the remote gateway server and transmitting the user datagram protocol to the administration site to indicate an active status of the remote gateway site on a periodic basis.

20. The method as recited in claim 13 further comprising generating a user datagram protocol packet at the remote gateway server and transmitting the user datagram protocol to the administration site to indicate an active status of the remote gateway site on a periodic basis via an encrypted socket connection.

* * * * *